(12) United States Patent
Eriksson et al.

(10) Patent No.: US 11,092,696 B2
(45) Date of Patent: Aug. 17, 2021

(54) GROUPING FOR EFFICIENT COOPERATIVE POSITIONING CALCULATIONS

(71) Applicant: VEONEER US INC., Southfield, MI (US)

(72) Inventors: Olof Eriksson, Älvsjö (SE); Christian Svensson, Vårgårda (SE); Tobias Aderum, Gothenburg (SE); Zhu Meifang, Lund (SE)

(73) Assignee: VEONEER US INC., Southfield, MI (US)

( * ) Notice: Subject to any disclaimer, the term of this patent is extended or adjusted under 35 U.S.C. 154(b) by 82 days.

(21) Appl. No.: 16/567,353

(22) Filed: Sep. 11, 2019

(65) Prior Publication Data

US 2020/0003907 A1 Jan. 2, 2020

Related U.S. Application Data

(63) Continuation of application No. PCT/US2017/066955, filed on Dec. 18, 2017.

(30) Foreign Application Priority Data

Mar. 17, 2017 (EP) .................................... 17161659

(51) Int. Cl.
*G01S 19/51* (2010.01)
*H04W 4/46* (2018.01)
(Continued)

(52) U.S. Cl.
CPC .............. *G01S 19/51* (2013.01); *B60R 21/01* (2013.01); *B60R 21/0134* (2013.01); *B60R 21/23138* (2013.01); *B60R 21/36* (2013.01); *B60R 22/48* (2013.01); *B60W 30/0953* (2013.01); *G01S 5/0072* (2013.01); *G01S 5/0289* (2013.01);
(Continued)

(58) Field of Classification Search
CPC ............. B60W 30/09; B60W 2556/65; B60W 2550/408; G08G 1/16; G08G 1/161; G08G 1/166
See application file for complete search history.

(56) References Cited

U.S. PATENT DOCUMENTS

| 2010/0060483 A1* | 3/2010 | McNew | ................ | G08G 1/164 |
| | | | | 340/907 |
| 2011/0087433 A1 | 4/2011 | Yester | .......................... | 701/301 |

(Continued)

*Primary Examiner* — Timothy X Pham
(74) *Attorney, Agent, or Firm* — Christopher P. Maiorana, PC

(57) ABSTRACT

An apparatus comprising a transceiver module and a processor. The transceiver may be configured to send/receive data messages to/from a plurality of vehicles. The processor may be configured to (i) determine a plurality of selected vehicles from the plurality of vehicles based on a selection criteria and (ii) calculate relative coordinates of the plurality of vehicles based on the data messages from the selected vehicles. The selection criteria may comprise determining (i) a target vehicle and (ii) at least two complementary vehicles. A predicted trajectory of the target vehicle may cross paths with a predicted trajectory of the apparatus. The complementary vehicles may be selected based on (i) an arrangement of the plurality of vehicles and (ii) speeds of the plurality of vehicles.

20 Claims, 9 Drawing Sheets

(51) Int. Cl.

| | |
|---|---|
| *B60W 30/095* | (2012.01) |
| *G01S 19/48* | (2010.01) |
| *G08G 1/16* | (2006.01) |
| *G01S 5/00* | (2006.01) |
| *G01S 5/02* | (2010.01) |
| *H04L 12/26* | (2006.01) |
| *H04W 56/00* | (2009.01) |
| *G01S 19/39* | (2010.01) |
| *B60R 21/01* | (2006.01) |
| *B60R 21/0134* | (2006.01) |
| *B60R 21/231* | (2011.01) |
| *B60R 21/36* | (2011.01) |
| *B60R 22/48* | (2006.01) |
| *G08G 1/01* | (2006.01) |
| *G05D 1/00* | (2006.01) |
| *G05D 1/02* | (2020.01) |
| *G08G 1/00* | (2006.01) |
| *G01S 13/87* | (2006.01) |

(52) U.S. Cl.
CPC ........ *G01S 13/878* (2013.01); *G01S 19/396* (2019.08); *G01S 19/48* (2013.01); *G05D 1/0022* (2013.01); *G05D 1/0027* (2013.01); *G05D 1/0214* (2013.01); *G05D 1/0217* (2013.01); *G05D 1/0295* (2013.01); *G08G 1/0112* (2013.01); *G08G 1/0133* (2013.01); *G08G 1/161* (2013.01); *G08G 1/164* (2013.01); *G08G 1/166* (2013.01); *G08G 1/22* (2013.01); *H04L 43/0864* (2013.01); *H04W 4/46* (2018.02); *H04W 56/006* (2013.01); *H04W 56/0065* (2013.01); *B60R 2021/01088* (2013.01); *B60R 2021/01231* (2013.01); *B60R 2021/01272* (2013.01); *B60W 2554/80* (2020.02); *B60W 2556/65* (2020.02); *G01S 2205/002* (2013.01)

(56) References Cited

U.S. PATENT DOCUMENTS

| | | | |
|---|---|---|---|
| 2011/0238306 | A1 | 9/2011 | Miucic |
| 2013/0018572 | A1* | 1/2013 | Jang .................... G08G 1/164 701/119 |
| 2013/0261947 | A1 | 10/2013 | Yamashiro |
| 2015/0262487 | A1 | 9/2015 | Cazanas |
| 2016/0280134 | A1* | 9/2016 | Miura ................... B60Q 9/008 |
| 2016/0341557 | A1 | 11/2016 | Kondo |
| 2017/0341641 | A1* | 11/2017 | Miller .................... G08G 1/164 |
| 2017/0369055 | A1* | 12/2017 | Saigusa ................ G08G 1/0116 |
| 2018/0061253 | A1* | 3/2018 | Hyun .................... G08G 1/166 |
| 2018/0345961 | A1* | 12/2018 | Saigusa ................. G08G 1/166 |

* cited by examiner

GROUPING FOR EFFICIENT COOPERATIVE POSITIONING CALCULATIONS

This application relates to International Application PCT/US2017/066955, with an International Filing Date of Dec. 18, 2017, which claims the benefit of EP Application No. EP17161659.2, filed Mar. 17, 2017, each of which is incorporated by reference in its entirety.

FIELD OF THE INVENTION

The present invention relates to object positioning generally and, more particularly, to grouping for efficient cooperative positioning calculations.

BACKGROUND OF THE INVENTION

Positioning of objects (i.e., vehicles, buildings, pedestrians, etc.) can be determined using GPS (Global Positioning System) or GNSS (Global Navigation Satellite System). Some applications that use positioning, such as assisted driving, need high precision data to be implemented safely. To calculate high precision data with GPS/GNSS, real-time kinematics (RTK) with base-stations are used, which is currently not viable for commercial use. Host vehicle gyros can also be used to estimate a future expected trajectory of objects, but if the initial GPS/GNSS position is incorrect the problem cannot be solved correctly.

In assisted driving applications, such as active intervention, knowledge of the positions of surrounding vehicles with high accuracy is utilized, which is currently implemented using many different sensors covering 360 degrees around a vehicle. There are many vehicle environment detection systems, such as camera systems, Doppler radar systems and LIDAR systems. Inaccuracies can lead to both false-positives and false-negatives. GPS/GNSS does not provide a sufficient degree of accuracy, especially in urban conditions.

Using periodic broadcasts to perform inter-vehicle range estimation can be used to obtain a high degree of accuracy regarding relative positioning between objects. Determining highly accurate relative positioning between objects introduces additional issues. Such issues include high computing costs and excessive communication between all vehicles for determining position accuracy that is precise enough for active intervention. In traffic scenarios with many vehicles in an area close to the host (or ego) vehicle, a high accuracy calculation based on cooperative positioning will use a very large amount of signal processing and radio data transfer to determine a solution.

It would be desirable to implement grouping for efficient cooperative positioning calculations.

SUMMARY OF THE INVENTION

The present invention concerns an apparatus comprising a transceiver module and a processor. The transceiver may be configured to send/receive data messages to/from a plurality of vehicles. The processor may be configured to (i) determine a plurality of selected vehicles from the plurality of vehicles based on a selection criteria and (ii) calculate relative coordinates of the plurality of vehicles based on the data messages from the selected vehicles. The selection criteria may comprise determining (i) a target vehicle and (ii) at least two complementary vehicles. A predicted trajectory of the target vehicle may cross paths with a predicted trajectory of the apparatus. The complementary vehicles may be selected based on (i) an arrangement of the plurality of vehicles and (ii) speeds of the plurality of vehicles.

BRIEF DESCRIPTION OF THE DRAWINGS

Embodiments of the invention will be apparent from the following detailed description and the appended claims and drawings in which:

DETAILED DESCRIPTION OF THE PREFERRED EMBODIMENTS

Embodiments of the present invention include providing grouping for efficient cooperative positioning calculations that may (i) calculate a relative position of vehicles, (ii) improve an accuracy of vehicle locations over GPS/GNSS solutions, (iii) implement a selection criteria for calculations, (iv) balance an accuracy of output calculations against an amount of processing to generate the calculations, (v) provide a solution that reduces overhead and/or (vi) be easy to implement.

Grouping and/or clustering may be used in telecommunication. Additionally, grouping and/or clustering may be implemented in the area of cooperative positioning, which is described in "Improving Cooperative Positioning for Vehicular Networks", IEEE Transactions of Vehicular Technology, Vol 60, no. 6 Jul. 2011, appropriate portions of which are incorporated by reference. In an example, grouping may be performed by approximate position and/or vehicle kinetics. A propagation delay of a wireless signal from a transmitter to a receiver may be used to estimate a distance. In one example, a round-trip time (RTT) (e.g., a round-trip delay time) may be used for estimating a distance accurately by sending a wireless signal between vehicles and/or objects (e.g., one at a time). Using periodic broadcasts is described in the paper "Inter-vehicle range estimation from periodic broadcasts" by Urs Niesen, Venkatesan N. Ekambaram, Jubin Jose, and Xinzhou Wu, appropriate portions of which are incorporated by reference. In order to establish initial positions from the measured ranges, Multi-Dimensional Scaling (MDS) may be used. MDS is described in the paper "Joint relative position and velocity estimation for an anchorless network of mobile nodes" by Raj Thilak Rajan, Geert Leus, and Alle-Jan van der Veen, appropriate portions of which are incorporated by reference.

Figure 1:
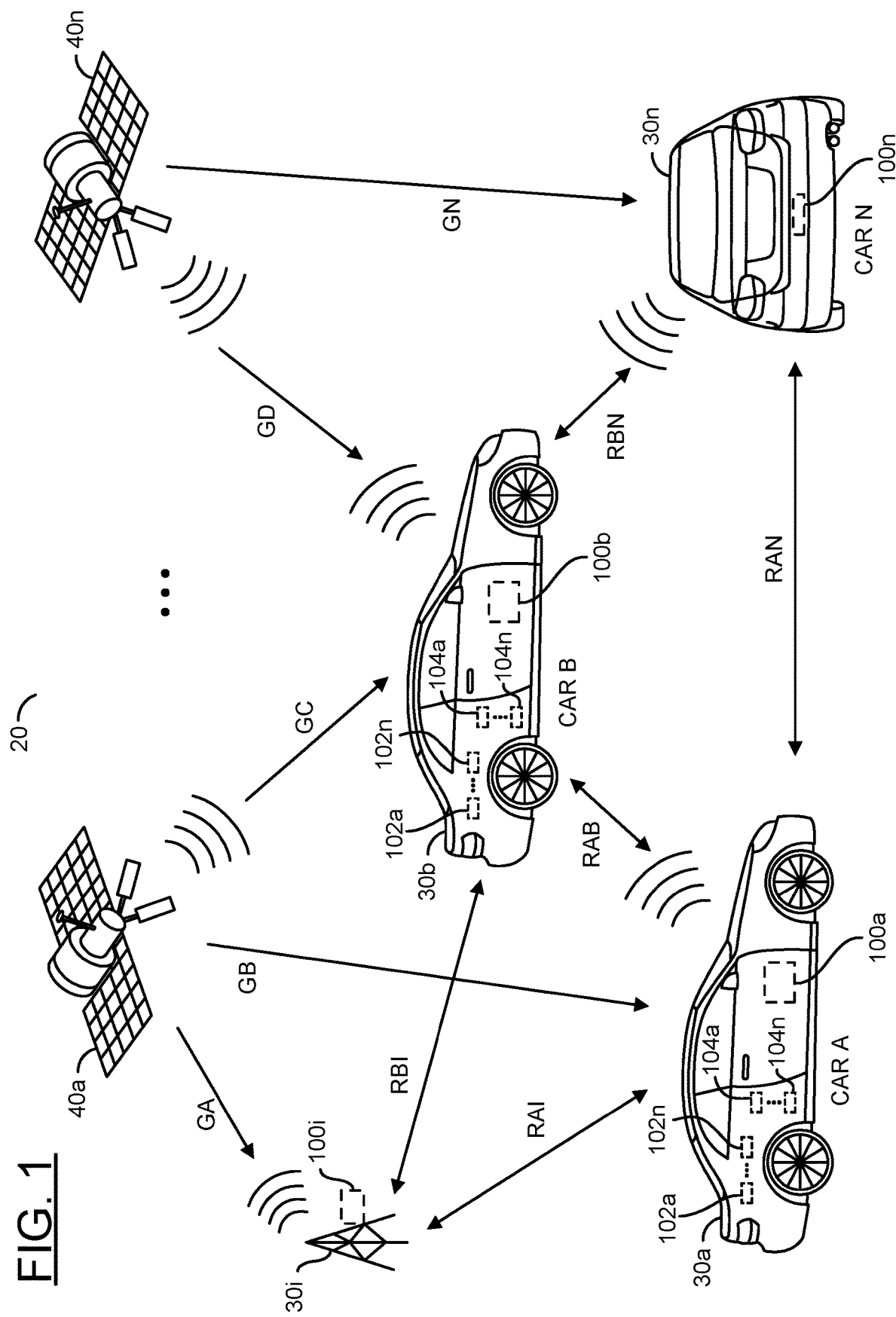
FIG. 1 is a diagram illustrating an embodiment of the present invention.

Referring to FIG. 1, a diagram illustrating an embodiment of the present invention is shown. An example system 20 is shown. The system 20 may comprise a number of objects 30a-30n and/or a number of communication satellites 40a-40n. In the example shown, the objects may comprise a combination of vehicles and/or base stations (e.g., infrastructure). In the example shown, two of the communication satellites 40a-40n are shown as a representation of a Global Positioning System (GPS) and/or Global Navigation Satellite System (GNSS) located around the world. In the example shown, the objects 30a, 30b and/or 30n may be vehicles and the object 30i may be a base station (e.g., a road side unit (RSU)). In some embodiments, each of the objects 30a-30n may be a vehicle (e.g., no base stations). The number of vehicles and/or base stations 30a-30n and/or communication satellites 40a-40n may be varied according to the design criteria of a particular implementation. The system 20 may be configured to adjust and/or self-correct for various numbers of the vehicles and/or base stations 30a-30n and/or communication satellites 40a-40n.

Each of the objects 30a-30n may comprise a respective apparatus (or circuit or module) 100a-100n. The modules 100a-100n may be described in more detail in connection with FIG. 2. The modules 1100a-100n may be implemented within and/or attached to the objects 30a-30n. In the example shown, the module 100a is shown within the vehicle 30a and the module 100i is attached to the base station 30i. For example, the modules 100a-100n may be located within a dashboard and/or with other electronics of the vehicles 30a-30n. In some embodiments, the modules 100a-100n may be implemented in a mobile device (e.g., a cell phone, tablet computing device, a computer, a stand-alone GPS device, a fitness monitoring device, a smartwatch, etc.). In an example, the mobile device implementing the modules 100a-100n may be operated within a vehicle that is moving. The location of and/or how the modules 100a-100n are connected to the objects 30a-30n may be varied according to the design criteria of a particular implementation.

In the example shown, the objects 30a-30n and/or the respective modules 100a-100n may be configured to communicate with the communication satellites 40a-40n. Generally, four or more of the communication satellites 40a-40n may be connected (e.g., via wireless communication signals). In another example, the connection to the satellites 40a-40n may be implemented through a GPS-type connection. The satellites 40a-40n may present signals (e.g., GA-GN). An example implementation uses a Global Navigation Satellite System (GNSS) or Global Positioning System (GPS). Location information (e.g., coordinates) may be calculated (e.g., by the modules 100a-100n and/or other components of the objects 30a-30n) from the signals GA-GN received from GNSS or GPS. The positional accuracy of the location information may be determined by the modules 100a-100n.

In some embodiments, the modules 100a-100n may be configured to receive the signals GA-GN sent by the satellites 40a-40n. The modules 100a-100n may be configured to calculate the location information (e.g., position data, coordinates, etc.) of the respective vehicles 30a-30n based on the data in the signals GA-GN. In some embodiments, the objects 30a-30n (e.g., a GPS module) may present the calculated location data to the modules 100a-100n. In some embodiments, (e.g., clear sky conditions with limited and/or no interference and/or multipath errors), the positional accuracy of the location information calculated from the signals GA-GN may be within an acceptable tolerance to provide one independently calculated source of positional data.

Local conditions may be any type of interference and/or multipath factor that may affect a determination of location information (e.g., position coordinates) using the signals GA-GN. For example, the local conditions may be due to ionospheric interference, noise, signal degradation caused by dense urban areas, signal degradation caused by tall buildings, etc. The modules 100a-100n may be configured to supplement and/or enhance the accuracy of the location data of the objects 30a-30n determined from the signals GA-GN by using cooperative positioning. For example, the modules 100a-100n may be configured to provide location data that is more accurate than location data calculated using the signals GA-GN.

In some embodiments, infrastructure (e.g., the base station 30i, in the example shown) may be implemented as a fixed base station, such as a cellular tower, a user installed fixed base station, and/or another type of fixed base station. While only the base station 30i is shown, generally more than one of the base stations 30i may be implemented to provide signals used to calculate the location information. In some embodiments, since the base station 30i may be at a known and fixed location, the base station 30i may be connected to the satellites 40a-40n, calculate location information from the signals GA-GN and provide a verification of the signals GA-GN compared to the known and fixed location of the base station 30i.

In one example, the modules 100a-100n are shown located in the vehicles 30a-30n. The modules 100a-100n may be implemented as a single unit (e.g., an installed device and/or module) and/or a distributed unit. For example, various components of the modules 100a-100n may be implemented at various locations in and/or on the vehicles 30a-30n and connected by an electronic network connecting one or more of the components and enabling a sharing of information in the form of digital signals (e.g., a serial bus, an electronic bus connected by wiring and/or interfaces, a wireless interface, etc.). In some embodiments, the modules 100a-100n may be implemented in an infotainment module of the vehicles 30a-30n.

The vehicles 30a-30n may each comprise a number of blocks (or circuits) 102a-102n and/or blocks (or circuits) 104a-104n. The circuits 102a-102n may be configured to implement sensors. The circuits 104a-104n may be configured to implement actuators. The sensors 102a-102n and/or the actuators 104a-104n may be connected through an electronic bus (to be described in association with FIG. 2) and/or a wireless connection. In some embodiments, the sensors 102a-102n and/or the actuators 104a-104n may be configured to communicate with the modules 100a-100n. The sensors 102a-102n may be configured to capture information from the environment near the vehicles 30a-30n. The actuators 104a-104n may be configured to cause the vehicles 30a-30n and/or components of the vehicles 30a-30n to perform an action. In some embodiments, the sensors 102a-102n and/or the actuators 104a-104n may be configured to read data to detect objects and/or perform actions in response to the detected objects to cause the vehicles 30a-30n to implement functions such as speed control, collision prediction, collision prevention, automatic alignment, online bumper fascia calibration, motion estimation, dead reckoning, Intersection Movement Assist (IMA), Left Turn Assist (LTA), Forward Collision Warning (FCW), Lane Change Warning (LCW) and/or scene understanding.

The modules 100a-100n may be configured to communicate signals (e.g., RAA-RNN). The signals RAA-RNN may be communicated between the modules 100a-100n to determine a relative distance between the objects 30a-30n. Generally, each of the modules 100a-100n may transmit one of the signals RAA-RNN to each of the modules 100a-100n (e.g., within a particular range). In the example shown, the module 100a may transmit the signal RAB to the module 100b, the signal RAI to the module 100i and the signal RAN to the module 100n. Similarly, in the example shown, the module 100b may transmit the signal RAB to the module 100a, the signal RBI to the module 100i and the signal RBN to the module 100n. The number of the signals RAA-RNN may be varied according to the design criteria of a particular implementation.

The signals RAA-RNN may be used by the modules 100a-100n to calculate a value of the range between the objects 30a-30n. In an example, the signals RAA-RNN may be configured similarly to a radar to measure the amount of time a transmitted signals takes to be sent to a destination and/or return from a destination. For example, the module 100a may perform ranging (e.g., determine the absolute distance between the objects 30a and 30b) by transmitting the signal RAB to the module 100b and measuring how long before the signal RAB returns to the module 100a (e.g., a round-trip time). The communication used to transmit the signal RAA-RNN may be implemented through a cellular network connection (e.g., 3G, 4G, 5G LTE, etc.), a Wi-Fi connection, a GPS-type connection, a radio signal, an ultrasonic signal and/or another type of wireless connection. In one example, the signals RAA-RNN may be implemented on a particular wireless frequency spectrum (e.g., 5.9 GHz Dedicated Short Range Communication spectrum). In another example, the signals RAA-RNN may be implemented as and/or alongside a Basic Safety Message (BSM). In yet another example, Wi-Fi may be implementing and the signals RAA-RNN may be part of a lower layer protocol configured to transmit timestamps (e.g., MAC and/or PHY). The signals RAA-RNN may be used to implement vehicle-to-vehicle (e.g., V2V) and/or vehicle-to-infrastructure (e.g., V2I) communication (e.g., V2X communication). The type of wireless connection used to communicate between the modules 100a-100n may be varied according to the design criteria of a particular implementation.

The relative positioning values (e.g., coordinates) calculated by the modules 100a-100n using the signals RAA-RNN may be configured to enable an implementation of cooperative positioning. The cooperative positioning and/or relative coordinates determined by the modules 100a-100n may have a greater accuracy than the location information determined using the signals GA-GN (e.g., using GNSS data). The cooperative positioning information may be fused with data acquired using the sensors 102a-102n and/or data generated using the signals GA-GN. The higher accuracy and/or precision of the relative position between the objects 30a-30n may reduce uncertainty, reduce a number of false positives, reduce erroneous data calculations and/or enable an improved Automotive Safety Integrity Level (ASIL) classification. For example, in urban scenarios with poor GNSS coverage, there may be GPS uncertainty and relying on GPS information may generate a large number of false positives and/or false negatives. The cooperative positioning may be used together with map information to provide improved navigation information.

The modules 100a-100n may be configured to enable sensor and/or data fusion. For example, the modules 100a-100n may be configured to receive data from one or more (e.g., disparate) sources (e.g., the signals GA-GN, the signals RAA-RNN, the sensors 102a-102n, etc.). The modules 100a-100n may combine and/or analyze the data from the different sources to make inferences about the environment surrounding the objects 30a-30n. The inferences made by the module 100a-100n may provide a greater accuracy and/or precision of data (e.g., relative positioning) than using one of the sources of data alone.

Figure 2:
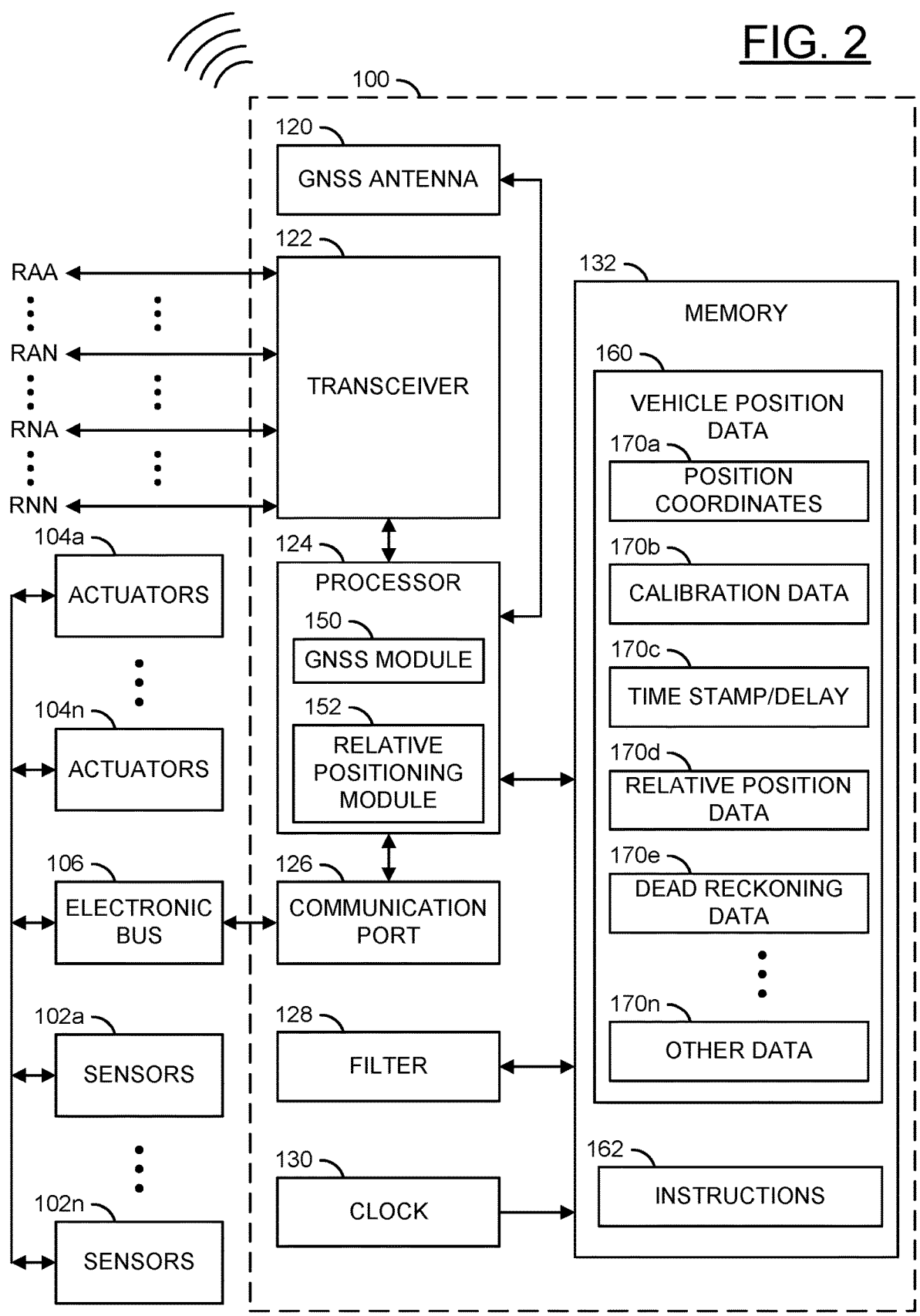
FIG. 2 is a diagram illustrating a module configured to determine high-precision range estimation.

Referring to FIG. 2, a diagram illustrating an example one of the modules 100a-100n configured to determine high-precision range estimation is shown. The module 100 is shown as a representative example of one of the modules 100a-100n. The module 100 may be configured to generate and/or calculate a position relative to other vehicles. The module 100 is shown transmitting/receiving the signals RAA-RNN. The module may send/receive other signals (not shown). For example, the module 100 may receive one or more of the signals GA-GN. The number and/or type of signals sent and/or received by the module 100 may be varied according to the design criteria of a particular implementation.

The module 100 may be connected to a block (or circuit) 106. The circuit 106 may implement an electronic bus. The electronic bus 106 may be configured to transfer data between the module 100 and the sensors 102a-102n and/or the actuators 104a-104n. In some embodiments, the electronic bus 106 may be implemented as a vehicle CAN bus. The electronic bus 106 may be implemented as an electronic wired network and/or a wireless network. Generally, the electronic bus 106 may connect one or more components of the vehicle 30 to enable a sharing of information in the form of digital signals (e.g., a serial bus, an electronic bus connected by wiring and/or interfaces, a wireless interface, etc.).

The module 100 generally comprises a block (or circuit) 120, a block (or circuit) 122, a block (or circuit) 124, a block (or circuit) 126, a block (or circuit) 128, a block (or circuit) 130 and/or a block (or circuit) 132. The circuit 120 may implement a GNSS antenna. The circuit 122 may implement a transceiver. The circuit 124 may implement a processor. The circuit 126 may implement a communication port. The circuit 128 may implement a filter. The circuit 130 may implement a clock. The circuit 132 may implement a memory. Other blocks (not shown) may be implemented (e.g., I/O ports, power connectors, interfaces, etc.). The number and/or types of circuits implemented by the module 100 may be varied according to the design criteria of a particular implementation.

The antenna 120 may be implemented as a dual band antenna capable of connecting to both a cellular network (e.g., to provide a potential connection option to the base stations 30i) and/or a GNSS network (e.g., the communication satellites 40a-40n). In another example, the antenna 120 may be implemented as two antennas. For example, one antenna may be specifically designed to connect to the base station(s) (e.g., 30i), while another antenna may be implemented to connect to the GNSS network satellites 40a-40n. The antenna 120 may be implemented as discrete antenna modules and/or a dual band antenna module. In some embodiments, the antenna 120 may be implemented as an off-board circuit (e.g., a component that is not part of the module 100). For example, the antenna 120 may send/receive data to/from the module 100 via the electronic bus 106. The implementation of the antenna 120 may be varied according to the design criteria of a particular implementation.

The transceiver 122 may be configured to communicate (e.g., send and/or receive) data (e.g., radio signals). The transceiver 122 may be configured to generate and/or receive one or more of the signals RAA-RNN. The transceiver 122 may receive data from the processor 124 to communicate with external devices (e.g., other of the modules 100a-100n). The transceiver 122 may receive communications from external devices (e.g., other of the modules 100a-100n) and transmit the communication signals to the processor 124. The transceiver 122 may be configured to communicate a Basic Safety Message (BSM) protocol and/or data outside the BSM protocol. In some embodiments, the transceiver 122 may send and/or receive the signals RAA-RNN through the communication port 126 and/or the sensors 102a-102n. The transceiver 122 may be configured to be compatible with one or more communications protocols (e.g., a Wi-Fi transceiver configured to perform dedicated short-range communication (DSRC), vehicle to vehicle (V2V) and/or vehicle to infrastructure (V2I) communication). The implementation of the transceiver 122 may be varied according to the design criteria of a particular implementation.

The processor 124 may be implemented as a microcontroller. The processor 124 may comprise a block (or circuit) 150 and/or a block (or circuit) 152. The circuit 150 may implement a GNSS module and/or chipset. The circuit 152 may implement a relative positioning module. The processor 124 may comprise other components (not shown). In some embodiments, the processor 124 may be a combined (e.g., integrated) chipset implementing processing functionality, the relative positioning chipset 152 and/or the GNSS chipset 150. In some embodiments, the processor 124 may be comprised of a number of separate circuits (e.g., the microcontroller, the GNSS chipset 150 and/or the relative positioning chipset 152). The GNSS module 150 and/or the relative positioning module 152 may each be an optional component of the processor 124. In an example, an off-board circuit (e.g., a component that is not part of the module 100) may perform the functions of the GNSS chipset 150 and send information to the module 100 (e.g., via the bus 106). In another example, an off-board circuit (e.g., a component that is not part of the module 100 such as a distributed and/or scalable computing service) may perform functions for determining the cooperative positioning data and send information to the module 100 (e.g., via the bus 106). The design of the processor 124 and/or the functionality of various components of the processor 124 may be varied according to the design criteria of a particular implementation. The processor 124 is shown sending data to and/or receiving data from the antenna 120, the transceiver 122, the memory 132 and/or the communication port 126.

The memory 132 may comprise a block (or circuit) 160 and a block (or circuit) 162. The block 160 may store vehicle position data. The block 162 may store computer readable instructions (e.g., instructions readable by the processor 124). The vehicle position data 160 may store various data sets 170a-170n. For example, the data sets 170a-170n may comprise position coordinates 170a, calibration data 170b, a time stamp/delay 170c, relative position data 170d, dead reckoning data 170e and/or other data 170n.

The position coordinates 170a may store location information data calculated and/or received by the module 100 from the signals GA-GN presented by the GNSS satellites 40a-40n. The signals GA-GN may provide data from which a particular resolution of location information positional accuracy may be calculated. In some embodiments, the position coordinates 170a may not provide sufficient positional accuracy for particular applications (e.g., lane detection, autonomous driving, etc.). The relative position data 170d may be used to improve the accuracy of the position coordinates 170a. In some embodiments, the position coordinates 170a may be calculated by the filter 128 and/or a component external to the module 100. In some embodiments, the position coordinates 170a may be calculated by the GNSS module 150.

The calibration data 170b may comprise parameters (e.g., coefficients) used to transform data received from the sensors 102a-102n and/or presented to the actuators 104a-104n. The calibration data 170b may provide many sets of coefficients (e.g., one set of coefficients for each of the sensors 102a-102n and/or the actuators 104a-104n). The calibration data 170b may be updatable. For example, the calibration data 170b may store current values as coefficients for the sensors 102a-102n and/or the actuators 104a-104n and as the data from the sensors 102a-102n and/or the actuators 104a-104n drifts the module 100 may update the calibration data 170b in order to maintain accuracy. The format of the calibration data 170b may vary based on the design criteria of a particular implementation.

The time stamp/delay 170c may be used to determine an age of the vehicle position data 160, the time of flight of the signals RAA-RNN and/or the round-trip time of the signals RAA-RNN. In one example, the time stamp 170c may be used to determine if the vehicle position data 160 should be considered reliable or unreliable (e.g., data older than a pre-determined threshold amount of time may be unreliable). In one example, the time stamp 170c may be appended to the signals RAA-RNN. For example, the time stamp 170c may record a time in Coordinated Universal Time (UTC) and/or in a local time. The implementation of the time stamp 170c may be varied according to the design criteria of a particular implementation.

The relative position data 170d may be used to augment (e.g., improve) a precision of the position coordinates 170a (e.g., the GNSS position) and/or provide an independent set of position data (e.g., cooperative position information). The relative position data 170d may comprise ranging data corresponding to the relative position of the vehicle 30 (e.g., the ego vehicle) to other vehicles. The relative position data 170d may represent a cooperative position solution (e.g., CoP). The relative position data 170d may be used to account (e.g., compensate) for the local conditions that may affect an accuracy of the position coordinates 170a. The relative position data 170d may provide higher precision location information than the position coordinates 170a. The relative position data 170d may be calculated by the relative positioning module 152.

The dead reckoning data 170e may be used to store past and/or present information to determine positions traveled by the vehicle 30. For example, the dead reckoning data 170e may store a previously determined position of the vehicle 30 (e.g., estimated speed, estimated time of travel, estimated location, etc.). The previously determined position may be used to help determine a current position of the vehicle 30. In some embodiments, the dead reckoning data 170e may be determined based on data from the sensors 102a-102n of the vehicle 52 (e.g., an on-board gyroscope and/or wheel click messages). The implementation and/or the information stored to determine the dead reckoning data 170e may be varied according to the design criteria of a particular implementation.

Various other types of data (e.g., the other data 170n) may be stored as part of the vehicle position data 160. For example, the other data 170n may store trend information for the calibration data 170b. For example, the other data 170n may store past data values of the calibration data 170b and/or current data values of the calibration data 170b. The past and current data values of the calibration data 170b may be compared to determine trends used to extrapolate and/or predict potential future values for the calibration data 170b. For example, the trend information may be used to continue to refine the calibration data 170b when the module 100 is operating in a pure dead reckoning mode (e.g., the location information fails the quality check). In some embodiments, the other data 170n may store various coordinate systems determined using a procrusting procedure and/or multi-dimensional scaling operations.

The processor 124 may be configured to execute stored computer readable instructions (e.g., the instructions 162 stored in the memory 132). The processor 124 may perform one or more steps based on the stored instructions 162. In an example, the processor 124 may calculate the location information (e.g., based on the received signals GA-GN). In another example, one of the steps of the instructions 162 may be executed/performed by the processor 124 and may determine the relative position data 170d based on the signals RAA-RNN. The instructions executed and/or the order of the instructions 162 performed by the processor 124 may be varied according to the design criteria of a particular implementation.

The communication port 126 may allow the module 100 to communicate with external devices such as the sensors 102a-102n and/or the actuators 104a-104n. For example, the module 100 is shown connected to the external electronic bus 106. The communication port 126 may allow the module 100 to share the cooperative position data 170d with various infrastructure and/or components of the vehicle 30 (e.g., the sensors 102a-102n and/or the actuators 104a-104n). The communication port 126 may allow the module 100 to receive information from the sensors 102a-102n of the vehicle 30 (e.g., an on-board gyroscope data, wheel click messages, LIDAR, etc.). For example, information from the module 100 may be communicated to an infotainment device for display to a driver. In another example, a wireless connection (e.g., Wi-Fi, Bluetooth, cellular, etc.) to a portable computing device (e.g., a smartphone, a tablet computer, a notebook computer, a smart watch, etc.) may allow information from the module 100 to be displayed to a user.

The filter 128 may be configured to perform a linear quadratic estimation. For example, the filter 128 may implement a Kalman filter. Generally, the filter 128 may operate recursively on input data to produce a statistically optimal estimate. For example, the filter 128 may be used to calculate the position coordinates 170a and/or estimate the accuracy of the position coordinates 170a. In some embodiments, the filter 128 may be implemented as a separate module. In some embodiments, the filter 128 may be implemented as part of the memory 132 (e.g., the stored instructions 162). The implementation of the filter 128 may be varied according to the design criteria of a particular implementation.

The clock 130 may be configured to determine and/or track a time. The time determined by the clock 130 may be stored as the time stamp data 170c. In some embodiments, the clock 130 may be configured to compare time stamps received in the signals RAA-RNN to determine a delay (e.g., a round-trip time).

The module 100 may be configured to calculate a position and/or broadcast data (e.g., via the transceiver 122 and/or the communication port 126) such as the positional coordinates 170a, an age of the data (e.g., when the data was last updated such as the time stamp 170c), the relative position data 170d and/or other data 170n. A method of communication implemented by the transceiver 122 and/or the communication port 126 and/or the type of data transmitted may be varied according to the design criteria of a particular implementation.

The module 100 may be configured as a chipset, a system on chip (SoC) and/or a discrete device. For example, the module 100 may be implemented as an electronic control unit (ECU). In some embodiments, the module 100 may be configured to calculate a position, velocity and time (PVT) solution, a relative positioning solution and/or a dead reckoning solution. In some embodiments, the module 100 may transmit received data (e.g., the signals GA-GN and/or the signals RAA-RNN) to other components external to the module 100 to perform calculations (e.g., the relative position data 170d may be sent to another component to determine the cooperative positioning solution). For example, PVT may be considered a bare minimum output for navigation. In some embodiments, the module 100 may comprise the GNSS chipset 150 and calculate a PVT solution and/or the dead reckoning solution. In some embodiments, the module 100 may be configured to receive a data stream that provides the PVT solution and may not determine the dead reckoning solution (e.g., the module 100 receives PVT data from an off-board component, determines the calibration data 170b and sends the calibration data 170b to an off-board component to determine the dead reckoning solution). In some embodiments, the module 100 may be configured to receive a data stream that provides the PVT solution and be configured to calculate the dead reckoning solution. The module 100 may be configured to supplement the PVT solution with the cooperative positioning solution determined based on the relative position 170d.

In some embodiments, the module 100 may use an external processor (e.g., an off-board processor) to perform the calculations to determine the relative position data 170d. In one example, the external processor may be implemented as a distributed computing service configured to scale and/or provision resources on demand (e.g., cloud computing). For example, the module 100 may receive the signals RAA-RNN and/or do range measurement, transmit the data to the cloud computing service and one or more processors of the cloud computing service may perform the calculations for generating the relative position data 170d. The module 100 may receive the calculations (e.g., the relative position data 170d) from the cloud computing service and store the data in the memory 132. In some embodiments, the instructions 162 may be stored on an external memory. The implementation of using the external components to supplement a capability of the module 100 may be varied according to the design criteria of a particular implementation.

Generally, the module 100 receives and/or determines a PVT solution, a dead reckoning solution and/or a cooperative positioning solution (e.g., CoP). The module 100 may be configured to separate and/or extract the data component of the dead reckoning data 170e, the data component of the PVT solution (e.g., the location data) and/or the relative position data 170d. In some embodiments, the instructions 162 may be executed by the processor 124 to provide responses to requests from other components of the vehicle 30. For example, a brake system of the vehicle 30 (e.g., one of the actuators 104a-104n) may request information from the module 100 before performing a particular response (e.g., to slow down).

The sensors 102a-102n may be configured to capture information from the environment surrounding the vehicle 30. The sensors 102a-102n may be vehicle sensors (e.g., speedometer, fluid sensors, temperature sensors, etc.). In some embodiments, data from the sensors 102a-102n may be used to determine the dead reckoning data 170e. In one example, the sensors 102a-102n may be various types of sensors configured to determine vehicle movement (e.g., magnetometers, accelerometers, wheel click sensors, vehicle speed sensors, gyroscopes, etc.). In another example, data from the sensors 102a-102n may be used to determine distances and/or directions traveled from a reference point. The types of sensors 102a-102n implemented may be varied according to the design criteria of a particular implementation.

The actuators 104a-104n may be components of the vehicle 30 configured to cause an action, move and/or control an aspect of the vehicle 30. For example, the actuators 104a-104n may be one or more of a braking system, a steering system, a lighting system, windshield wipers, a heating/cooling system, etc. In some embodiments, the actuators 104a-104n may be configured to respond to information received from the module 100 and/or the sensors 102a-102n. For example, if one of the actuators 104a-104n is a steering system, the steering system may receive information from the module 100 indicating that a collision with a nearby vehicle is likely and the steering system may respond by causing the vehicle to change direction. The types of actuators 104a-104n implemented may be varied according to the design criteria of a particular implementation.

In some embodiments, the sensors 102a-102n and/or the actuators 104a-104n may be implemented to enable autonomous driving of the vehicle 30. For example, the sensors 102a-102n may receive and/or capture input to provide information about the nearby environment. The information captured by the sensors 102a-102n may be used by components of the vehicle 30 and/or the module 100 to perform calculations and/or make decisions. The calculations and/or decisions may determine what actions the vehicle 30 should take. The actions that the vehicle 30 should take may be converted into signals readable by the actuators 104a-104n. The actuators 104a-104n may cause the vehicle 30 to move and/or respond to the environment. For example, the module 100 may present an output that provides a relative position of the vehicle 30 to other vehicles. In some embodiments, the module 100 may provide the relative position data 170d (e.g., the cooperative positioning solution) to increase an ASIL classification of the vehicle 30. Other components may be configured to use the data provided by the module 100 to make appropriate decisions for autonomous driving.

The modules 100a-100n may be configured to use round-trip time for estimating relative positions. Using round-trip time to estimate relative positions may result in a multitude of solutions (e.g., since there may be more unknowns than the number of equations). The modules 100a-100n may be configured to reliably and/or unambiguously obtain relative distances between objects (e.g., the objects 30a-30n) by means of round-trip time measurements.

The modules 100a-100n may be configured to perform a position estimation. For example, the modules 100a-100n may each comprise the transceiver 122 configured to send and/or receive the radio signals RAA-RNN. The processor 124 of each of the modules 100a-100n may be configured to repeatedly perform a number of steps according to the instructions 162. In one example, the processor 124 may execute one or more of the instructions 162 to calculate a time of flight (TOF) for the signals RAA-RNN. For example, the signals RAA-RNN may be sent pair-wise between two of the transceivers 122 (e.g., a transceiver 122 implemented by the module 100a and a transceiver 122 implemented by the module 100b). In another example, the processor 124 may execute one or more of the instructions 162 to calculate possible positions for the modules 100a-100n, which may result in many possible positions for each of the modules 100a-100n. In yet another example, the processor 124 may execute one or more of the instructions 162 to perform multi-dimensional scaling (MDS) calculations in order to obtain relative positions of the modules 100a-100n in a particular coordinate system. In some embodiments, the processor 124 may be configured to repeatedly perform a procrusting procedure (e.g., after two initial MDS calculations and between every two consecutive MDS calculations). The procrusting procedure may comprise translation, scaling and/or rotation of the particular coordinate system to generate a corrected coordinate system. For example, the procrusting procedure may be configured to determine the corrected present coordinate system such that a smallest change for the relative positions of the modules 100a-100n (e.g., the relative position data 170d) between the consecutive MDS calculations may be obtained.

In some embodiments, for each pair of the modules 100a-100n, the processor 124 may be configured to calculate time of flight as the time for one of the signals RAA-RNN to travel from the transmitting transceiver (e.g., the transceiver 122 of the module 100a) to a receiving transceiver (e.g., the transceiver 122 of the module 100b). In some embodiments, the processor 124 may be configured to calculate time of flight as the time for one of the signals RAA-RNN to travel from a transmitting transceiver to a receiving transceiver and back to the transmitting transceiver (e.g., at least one time, such that round-trip time (RTT) may be determined for each pair of the modules 100a-100n). In some embodiments, the processor 124 may be configured to calculate time of flight either with knowledge of a delay time between each re-transmission and/or by repeated transmissions that comprise time stamps generated by the different modules 100a-100n (e.g., to indicate when the signals RAA-RNN were received by each of the modules 100a-100n). The method of determining the time of flight may be varied according to the design criteria of a particular implementation.

The signals RAA-RNN may be configured to be compatible with a mobile base system protocol. In one example, the protocol implemented by the signals RAA-RNN may be a basic safety message (BSM) plus additional information. Generally, BSM type messages may broadcast similar information. The modules 100a-100n may be configured to send a small message outside of the standard BSM type message protocol. For example, the round-trip time and/or the time stamp 170c may be transmitted as part of the signals RAA-RNN but outside of the BSM message. The signals RAA-RNN may be transmitted at a pre-determined update rate. In one example, the update rate of the signals RAA-RNN may be 10 Hz (e.g., 100 ms). In some embodiments, the signals RAA-RNN may be transmitted as BSM signals via a standard service channel. For example, using the standard service channel, the signals RAA-RNN may be transmitted to a cluster head for the objects 30a-30n. If a target object is outside a range of the service channel, multihopping may be implemented (e.g., transmitting the signals RAA-RNN from a local cluster head to another cluster head and then to the target vehicle). The protocol(s) implemented by the signals RAA-RNN may be varied according to the design criteria of a particular implementation.

Figure 3:
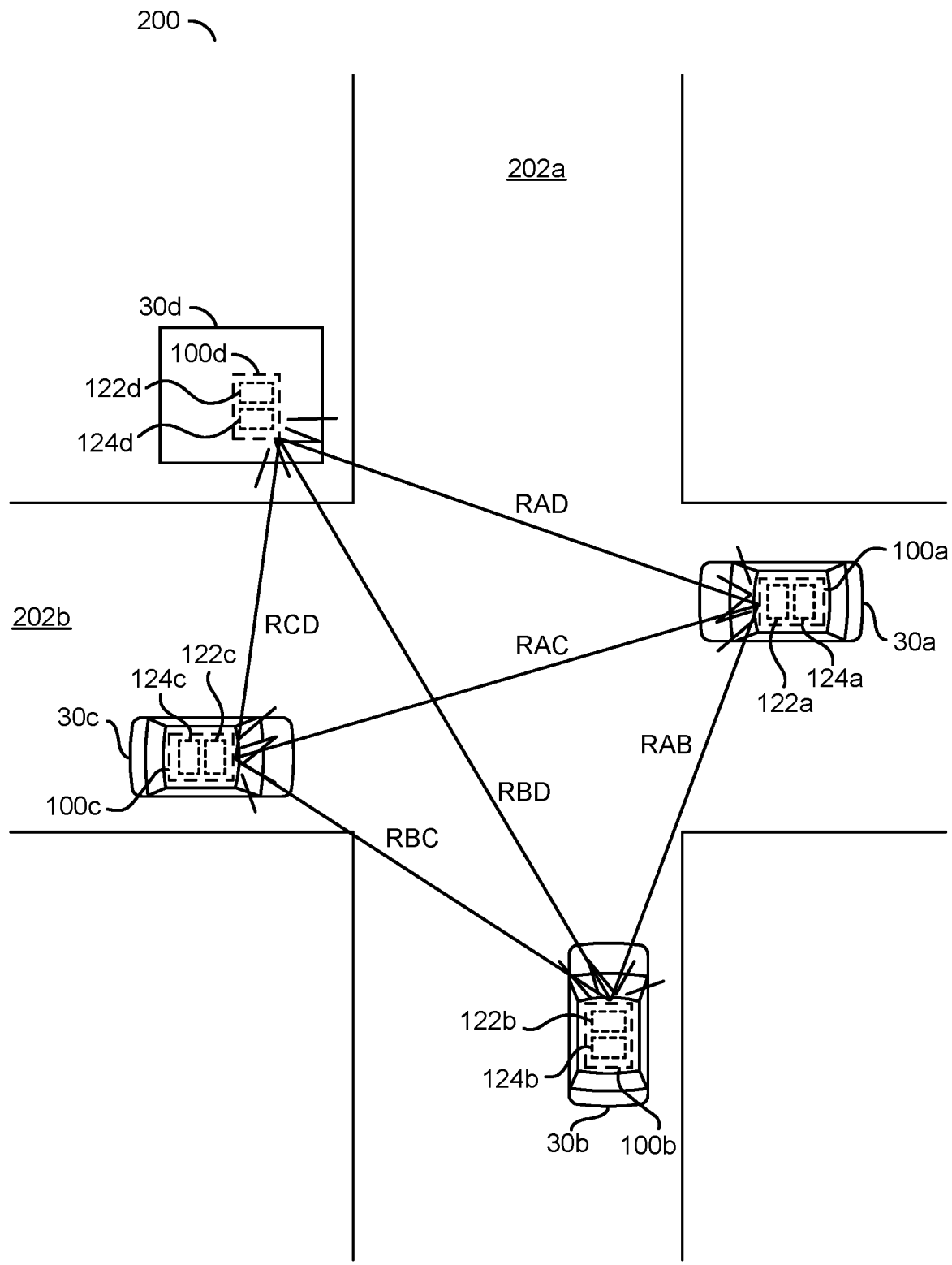
FIG. 3 is a diagram illustrating inter-vehicle range estimation.

Referring to FIG. 3 a diagram illustrating inter-vehicle range estimation is shown. An example system 200 is shown. The example system 200 may be implemented by four objects 30a-30d at an intersection of a road 202a and a road 202b. Each of the objects 30a-30d may comprise a corresponding one of the modules 100a-100d. In the example system 200, the objects 30a-30c may be vehicles and the object 30d may be infrastructure (e.g., a cell phone tower, a traffic sign, a traffic light, part of a building, etc.). On the vehicle 30a, the transceiver 122a and the processor 124a are shown.

Similarly, the objects 30b-30d may comprise transceivers 122b-122d and/or processors 124b-124d. Generally, the example system 200 comprises four of the modules 100a-100n. However, the number of the modules 100a-100n may be varied according to the design criteria of a particular implementation.

In the example system 200, the modules 100a-100d may communicate between at least two other of the modules 100a-100d. The signal RAB is shown being transmitted between the vehicle 30a and the vehicle 30b, the signal RAC is shown being transmitted between the vehicle 30a and the vehicle 30c, the signal RAD is shown being transmitted between the vehicle 30a and the object 30d, the signal RBC is shown being transmitted between the vehicle 30b and the vehicle 30c, the signal RBD is shown being transmitted between the vehicle 30b and the object 30d, and the signal RCD is shown being transmitted between the vehicle 30c and the object 30d. The signals RAA-RNN may be transmitted simultaneously, in a particular order, in response to one of the signals RAA-RNN and/or periodically. The signals RAA-RNN may be transmitted back and forth between each of the modules 100a-100n.

In some embodiments, each of the modules 100a-100d may be configured to calculate the round-trip time for each of the signals RAB-RCD sent between each of the modules 100a-100d. For example, the module 100a may be configured to calculate the round-trip time for each of the signals RAB-RAD sent from the module 100a to the other modules 100b-100d, as well as the round-trip times for the signals RAB, RBC and/or RBD sent by the module 100b to the other modules 100a, 100c and/or 100d, the signals RAC, RBC and/or RCD sent by the module 100c to the other modules 100a, 100b and/or 100d and/or the signals RAD, RBD and/or RCD sent by the module 100d to the other modules 100a-100c. Using the calculated round-trip times, each of the processing units 124a-124d may be configured to calculate possible positions for the modules 100a-100d (and the objects 30a-30d), which may result in multiple possible positions for each of the modules 100a-100d (e.g., since there are more unknowns than the number of equations).

In some embodiments, the modules 100a-100d may be configured to calculate a time of flight (TOF) (e.g., pair-wise) between two of the modules (e.g., 100a-100b) among the modules 100a-100d, one or more times. In one example, for each pair of the modules 100a-100d, the processors 124a-124d may be configured to determine the time of travel of the signals RAB-RCD from a transmitting one of the modules 100a-100d to a receiving one of the modules 100a-100d (e.g., a time of travel of the signal RAB from the transmitting module 100a to the receiving module 100b). To determine the time of travel (e.g., for time of flight), the modules 100a-100d may have synchronized clocks (e.g., the clocks 130 may be synchronized). In another example, for each pair of the modules 100a-100d, the processors 124a-124d may be configured to determine the round-trip time of travel of the signals RAB-RCD from a transmitting one of the modules 100a-100d to a receiving one of the modules 100a-100d and back to the transmitting one of the modules 100a-100d (e.g., a time of travel of the signal RBC from the transmitting module 100b to the receiving module 100c and back to the transmitting module 100b from the receiving module 100c, possibly including a delay time). To determine the time of travel (e.g., for round-trip time), the clocks 130 may not need to be synchronized, but the delay 170c may be known. If the delay time 170c is not known, repeated transmissions may be implemented (e.g., with 5 time stamps at the different modules 100a-100d).

Each of the processors 124a-124d may determine the possible positions for the modules 100a-100d. The processors 124a-124d may be configured to perform a multi-dimensional scaling (MDS) operation. The MDS operation may be implemented to calculate relative positions of the modules 100a-100d in a coordinate system. The processors 124a-124d may be configured to perform another MDS operation (e.g., at a later time). The MDS operation may be implemented to calculate another set of relative positions of the modules 100a-100d in another coordinate system. For example, a first MDS operation may determine relative positions in a first coordinate system and a second MDS operation may determine relative positions in a second coordinate system.

Each of the processors 124a-124d may be configured to perform a procrusting procedure. The procrusting procedure may comprise one or more of translation operations, scaling operations and/or rotation operations of one of the coordinate systems used by the MDS operations. The procrusting procedure may be configured to generate a corrected coordinate system. The corrected coordinate system may be implemented to determine a smallest change for the relative positions of the modules 100a-100d between the first MDS operation and the second MDS operation. The modules 100a-100d may be configured to continually perform MDS operations. For each of the following MDS operations, the procrusting procedure may be performed to generate an updated (e.g., current) corrected coordinate system.

The processors 124a-124d may be configured to continually and/or repeatedly calculate a TOF and/or RTT for the signals RAB-RCD sent between the modules 100a-100d, calculate possible positions for the modules 100a-100d (e.g., which may result in numerous possible positions for each of the modules 100a-100d), and/or perform MDS operations in order to obtain relative positions of the modules 100a-100d in a coordinate system. After two initial MDS operations, the processors 124a-124d may be configured to repeatedly perform a procrusting procedure between MDS calculations. In one example, the procrusting procedure may be performed between every two consecutive MDS calculations. The procrusting procedures may generate the corrected coordinate system (e.g., corresponding to the current location of the vehicles 30a-30d). In one example, the procrusting procedure may be performed using a Maximum Likelihood Estimation (MLE) computation. In another example, the procrusting procedure may be performed using a Least Squares Estimation (LSE) computation. In some embodiments, vehicle dynamics comprising gyro data, acceleration data and/or velocity data (e.g., data from the sensors 102a-102n, the dead reckoning data 170d and/or the position coordinates 170a) may be used by the processors 124a-124d (e.g., to enhance the accuracy of the calculated solution).

The modules 100a-100d may be connected to a warning and/or information device (e.g., a heads up display, an infotainment unit, an audio system, etc.) implemented in a corresponding one of the objects 30a-30d. For example, the warning and/or information device may be configured to send a notification and/or alert to the driver of a vehicle based on the cooperative positioning data calculated by the modules 100a-100d (e.g., a warning if a collision is likely). In some embodiments, the modules 100a-100d may be configured to communicate (e.g., via the electronic bus 106) to other vehicle environment detection devices (e.g., the sensors 102a-102n). For example, the sensors 102a-102n may comprise devices (e.g., radar devices, camera devices, LIDAR devices, etc.) configured to determine a position of one of the objects 30a-30d.

In some embodiments, the objects 30a-30d may not each implement one of the modules 100a-100d. For example, the vehicle 30a may implement the module 100a-100d and the objects 30b-30d may implement the transceivers 122b-122d. Implementing the transceivers 122b-122d without the modules 122b-122d may enable the objects 30b-30d to communicate the signals RAB-RCD but the calculations for the cooperative positioning solution may be performed by the module 100a. For example, the module 100a may determine the cooperative position solution from the signals RAB-RCD and send the data to each of the transceivers 122b-122d to provide the cooperative position solution to the other objects 30b-30d.

In some embodiments, in order to acquire an estimate of the relative position data 170d of the modules 100a-100d within an acceptable tolerance, the processors 124a-124d may be configured to repeatedly perform at least five procrusting procedures with intermediate MDS calculations. In some embodiments, the processors 124a-124d may be configured to calculate time of flight either with knowledge of a delay time between each re-transmission and/or by repeated transmissions with time stamps at the different transceivers.

To determine the relative positions of the modules 100a-100d, the MDS operations may be performed. The output generated in response to the MDS operations may present a true relative position between the objects 30a-30d. The procrusting procedure may be configured to rotate (e.g., rotating an X-Y diagram) the relative positioning (e.g., mirrored and/or translated) to provide additional compensation. The additional compensation performed by the procrusting procedure may provide a correct relative positioning (e.g., the relative position data 170d).

In the example shown, four objects (e.g., 30a-30d) are shown transmitting the signals RAB-RCD. The number of signals and/or objects may be varied according to the design criteria of a particular implementation. Increasing the number of objects (e.g., 30a-30n) may improve an accuracy of the cooperative positioning solution calculated at the cost of computational efficiency. Decreasing the number of objects (e.g., less than four of the objects 30a-30d) may decrease a computational cost but may not provide sufficient accuracy (e.g., the accuracy of the cooperative positioning solution may not be an improvement over a GNSS solution). Generally, determining a cooperative positioning solution using four of the objects 30a-30n may provide a balanced tradeoff between an accuracy of the relative positioning coordinates 170d and the computational processing power of the processor 124. For example, using more than four of the objects 30a-30n may provide diminishing returns on the accuracy of the relative positioning coordinates 170d.

In some embodiments, the modules 100a-100d may be configured to predict a trajectory (e.g., path) of the objects 30a-30d. The modules 100a-100d may calculate and/or receive an associated location and/or velocity (e.g., a low accuracy position, speed and/or heading) for each of the objects 30a-30d. In one example, the predicted trajectory may be calculated using the GPS heading and/or GPS speed information. In another example, the predicted trajectory may be calculated using the time of flight and/or round-trip time information. In yet another example, the predicted trajectory may be calculated based on the shape and/or path of the roads 202a-202b. In still another example, one or more of the objects 30a-30d may not have a predicted trajectory and/or have a null value for the predicted trajectory (e.g., the object 30d may be stationary). The predicted trajectory may be communicated to/from the modules 100a-100d as data messages using the signals RAB-RCD and/or stored in the memory 132.

Figure 4:
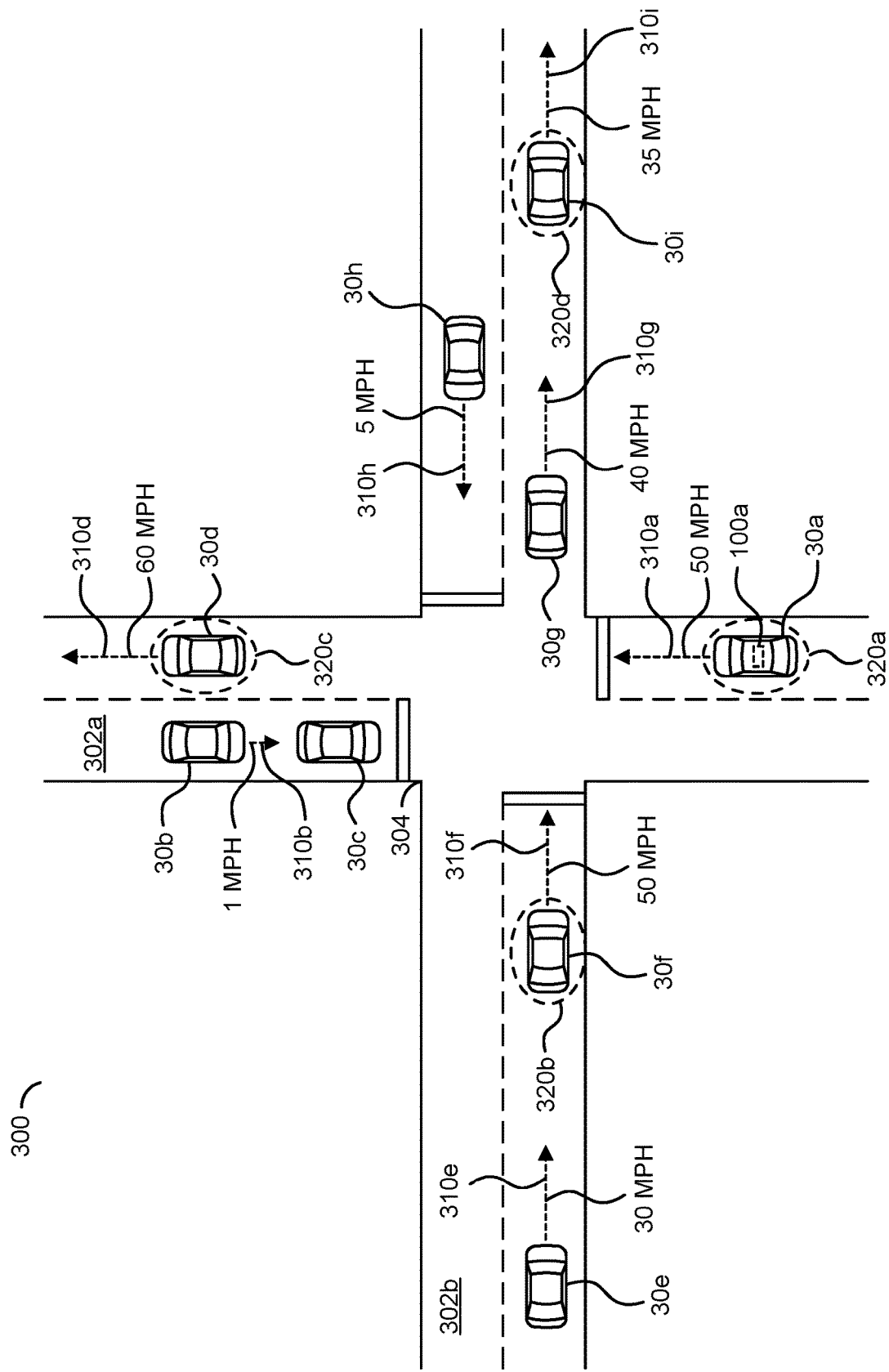
FIG. 4 is a diagram illustrating a selection criteria for an example traffic scenario.

Referring to FIG. 4, a diagram illustrating a selection criteria for an example traffic scenario 300 is shown. A road 302a and a road 302b are shown. The roads 302a-302b may meet at an intersection 304. In the example traffic scenario 300 shown, the vehicles 30a-30i may be driving on the roads 302a-302b. In the example shown, the apparatus 100a may be implemented in (or on) the vehicle 30a (e.g., the host vehicle). Similarly the other vehicles 30b-30i may implement one of the modules (e.g., 100b-100i). The number of vehicles in a vicinity when determining the selection criteria may be varied according to the design criteria of a particular implementation.

The apparatus 100a may be configured to select information from remote vehicles to use for the cooperative positioning calculations (e.g., CoP). To improve computational efficiency and/or reduce uncertainty to an acceptable level (e.g., a level allowable according to various autonomous driving standards), the apparatus 100a may be configured to determine which of the vehicles 30a-30i that may provide the most useful information in order to achieve a minimum amount of uncertainty (e.g., reduce uncertainty as much as possible using the available data). The apparatus 100a may be configured to implement a selection criteria to determine which of the vehicles provide the most useful information for efficiently determining a solution. In one example, the selection criteria may be implemented as part of the instructions 162. In another example, the selection criteria may be implemented as part of the relative positioning module 152. In yet another example, the selection criteria may be implemented as a firmware component of the processor 124. The selection criteria may be varied according to the design criteria of a particular implementation.

Using different combinations of information (e.g., data messages) received from the vehicles 30a-30i, different amounts of computation (or processing) may be performed and/or different amounts of uncertainty of the relative positioning solution for the vehicles 30a-30i may result. The selection criteria implemented by the module 100a may determine which combinations of information may provide a low computational cost (e.g., efficient calculations in terms of processing power and/or an amount of time to determine a solution) and a low amount of uncertainty of the relative positioning solution. In one example, the selection criteria may select some of the information from the vehicles 30a-30i to achieve a balance between a computation time, an amount of power usage and an accuracy of the relative positioning solution.

In some embodiments, the selection criteria may select four of the vehicles 30a-30i. Selecting four of the vehicles 30a-30i may be sufficient to achieve the balance between a computation time, an amount of power usage and/or an accuracy of the relative positioning solution. For example, selecting more than four of the vehicles 30a-30i may provide diminishing returns on an improvement (e.g., accuracy) of the relative positioning solution, while increasing power usage and/or computation time. To achieve an acceptable level of accuracy (e.g., approximately less than ±1 meter)

the selection criteria may select (e.g., select four) from the nearby vehicles 30a-30i based on a distance, an arrangement (e.g., orientation) between the vehicles 30a-30i and/or a speed (or velocity) of the vehicles 30a-30i.

The apparatus 100a may be configured to group and/or track the vehicles 30a-30n and select from the vehicles 30a-30i (e.g., select four vehicles) that may provide the best/optimal output (e.g., by considering the balance between computation time, computation cost, amount of uncertainty of the solution and/or the information available) for the cooperative positioning solution. The relative positioning module 152 may group and/or track the vehicles 30a-30i based on a low accuracy positions (e.g., GNSS solutions). For example, the signals RAA-RNN may comprise the low accuracy positions of the vehicles 30a-30i. In one example, each vehicle of the vehicles 30a-30i may implement one of the modules 100a-100i and calculate the GNSS solution (e.g., the position coordinates 170a) based on the signals GA-GN and communicate the GNSS solution using the signals RAA-RNN. In another example, the information in the signals RAA-RNN may be used to calculate time of flight information and/or round-trip time information. The implementation of the communication and/or the calculation of the low accuracy positions may be varied according to the design criteria of a particular implementation.

Generally, the GNSS solution may have a low accuracy in terms of positioning compared to the cooperative positioning solution. However, the GPS heading and/or speed information may be accurate. The selection criteria may use the GPS heading and/or GPS speed information to identify which of the vehicles 30a-30i to select to perform the cooperative positioning calculations.

The selection criteria analysis performed by the relative positioning module 152 may determine which of the vehicles may intercept the predicted travel path of the host vehicle 30a. At least one of the vehicles 30b-30i may be considered a target vehicle (e.g., a vehicle likely to cross the predicted path of the host vehicle 30a within a particular amount of time). The vehicle considered to be the target vehicle may be likely to collide with the host vehicle 30a (e.g., based on the low accuracy solution). In one example, the target vehicle may be one of the vehicles 30b-30n that crosses the predicted travel path of the host vehicle 30a within 10 seconds. In another example, the target vehicle and the host vehicle 30a may converge at the same location within a pre-determined amount of time. The selection criteria may select the target vehicle as one of the vehicles from which to receive information in order to determine the cooperative positioning solution.

The selection criteria analysis performed by the relative positioning module 152 may select at least two other of the vehicles 30b-30i (e.g., the complementary vehicles) to receive information from to use for the cooperative positioning solution. The selection criteria may be used to determine the complementary vehicle based on a distance and/or relative speed compared to the host vehicle 30a. Generally, the selection criteria may define a selection for the host vehicle 30a, the target vehicle and the vehicles that are furthest away and have the highest relative speed (e.g., complementary vehicles).

The selection criteria analysis may select the data messages from the vehicles 30a-30n to provide information for the relative positioning module 152 to perform the cooperative positioning calculations. The cooperative positioning calculations may generate the relative position data 170d that may have a higher precision than the position coordinates 170a (e.g., low accuracy results) determined using GNSS data. For a limited number of vehicles, the remaining vehicles (e.g., the vehicles 30b-30i) may use the improved positioning of the relative position data 170d as anchors to improve a position based on either relative GPS and/or the time-of-flight data coming from the cooperative positioning solution.

In the example traffic scenario 300 shown, each of the vehicles 30a-30i may have an associated location and/or velocity 310a-310i (e.g., low accuracy position, speed and/or heading). In one example, the velocity information 310a-310i may be calculated using the GPS heading and/or GPS speed information. In another example, the velocity information 310a-310i may be calculated using the time of flight and/or round-trip time information. The velocity information 310a-310i may be communicated to/from the modules 100a-100i as data messages using the signals RAA-RNN.

In the example shown, the vehicle 30a may have the velocity 310a of 50 mph heading north, the vehicle 30b may have the velocity 310b of 1 mph heading south, the vehicle 30c may have the velocity 310c of 0 mph heading south (not shown), the vehicle 30d may have the velocity 310d of 60 mph heading north, the vehicle 30e may have the velocity 310e of 30 mph heading east, the vehicle 30f may have the velocity 310f of 50 mph heading east, the vehicle 30g may have the velocity 310g of 40 mph heading east, the vehicle 30h may have the velocity 310h of 5 mph heading west, and the vehicle 30i may have the velocity 310i of 35 mph heading east. The selection criteria implemented by the module 100a may select from the vehicles 30a-30i based on the velocity information 310a-310i and/or the arrangement and distance with respect to the host vehicle 30a.

A number of dotted shapes 320a-320d are shown. The dotted shapes 320a-320d may represent the selected vehicles determined by the selection criteria analysis implemented by the module 100a. In the example traffic scenario 300, the selected vehicles 320a-320d may comprise four vehicles (e.g., the vehicle 30a, the vehicle 30d, the vehicle 30f and the vehicle 30i). The selected vehicle 320a may be the host vehicle 30a (e.g., the module 100a may be implementing the selection criteria). The selected vehicle 320b may be the target vehicle 30f. The selected vehicle 320c may be the vehicle 30d and the selected vehicle 320d may be the vehicle 30i (e.g., the complementary vehicles).

The vehicle 30f may be selected as the target vehicle (e.g., the selected vehicle 320b). The analysis performed by the selection criteria may determine that the vehicle 30f may be the most likely of the vehicles 30b-30i to cross the predicted path of the host vehicle 30a. In the example shown, the vehicle 30a and the vehicle 30f may cross the intersection 304 at approximately the same time from the road 302a and the road 302b, respectively (e.g., both vehicles are approximately the same distance from the intersection 304 and traveling at the same speed). The analysis by the selection criteria may determine that the vehicles 30g and 30i may not cross the predicted paths with the vehicle 30a (e.g., traveling away from the intersection 304 on the road 302b). The analysis by the selection criteria may determine that the vehicle 30e may not cross predicted paths with the vehicle 30a (e.g., the vehicle 30e is farther away from the intersection 304 and traveling behind and slower than the vehicle 30f).

The analysis by the selection criteria may determine that the vehicle 30d may not cross predicted paths with the vehicle 30a (e.g., the vehicle 30d is traveling away from the intersection 304 on the road 302a and is traveling faster to the north than the vehicle 30a). The analysis by the selection criteria may determine that the vehicles 30b and 30c may not cross predicted paths with the vehicle 30a (e.g., both are nearly stopped at the intersection 304). In some embodiments, the analysis by the selection criteria may not be able to determine that the vehicles 30b and 30c are in the opposite lane (e.g., the low accuracy position results may not provide sufficient evidence that the vehicles are in different lanes). If there is sufficient accuracy from the low accuracy result to determine the vehicles 30b and/or 30c are in an opposite lane to the host vehicle 30a, then the selection criteria may determine that the vehicles 30b and 30c may not cross predicted paths with the vehicle 30a on the basis of traveling in opposite lanes. The analysis by the selection criteria may determine that the vehicle 30h may be a candidate for the target vehicle. However, the vehicle 30h is approaching the intersection 304 at a low speed (e.g., 5 mph), is farther away from the vehicle 30a than the distance between the vehicle 30f and the vehicle 30a, and may be slowing down to stop before entering the intersection 304 (e.g., the vehicle 30f may be a better candidate for the target vehicle than the vehicle 30h). By analyzing the velocity information 310a-310i and/or the position of the vehicles 30a-30i, the selection criteria implemented by the relative positioning module 152 may determine that the target vehicle 320b may be the vehicle 30f.

In the example traffic scenario 300 with the vehicle 30f selected as the target vehicle 320b by the selection criteria, the relative positioning module 152 may select the complementary selected vehicles 320c-320d. The complementary selected vehicles 320c-320d may be selected with respect to the selected vehicles 320a-320b. For example, the selection criteria may prefer the complementary selected vehicles 320c-320d to be furthest away and/or at approximately 90 degrees to the two selected vehicles 320a-320b (e.g., to form four corners of a rectangular shape with each corner having a sufficient distance from each other). The selection criteria may prefer vehicles that are traveling at a higher speed and at least at a speed of approximately 7 mph (e.g., 3 meters per second).

In the example traffic scenario 300 with the vehicle 30f selected as the target vehicle 320b by the selection criteria, the relative positioning module 152 may select the vehicle 30d as the selected vehicle 320c and the vehicle 30i as the selected vehicle 320d. The vehicles 30d and 30i may be the complementary selected vehicles 320c-320d based on the distance and/or speed relative to the selected vehicles 320a-320b. The analysis by the selection criteria may determine that the vehicle 30e is far from the selected vehicle 320a but close to the selected vehicle 320b. The analysis by the selection criteria may determine that the vehicle 30c is not moving (e.g., an elimination factor).

The analysis by the selection criteria may determine that the vehicle 30g is close to both the selected vehicles 320a-320b (e.g., an elimination factor). The analysis by the selection criteria may determine that the vehicle 30b and the vehicle 30d are both far from the selected vehicles 320a-320b. However, the velocity information 310b indicates the vehicle 30b is traveling at 1 mph (e.g., an elimination factor) and the velocity information 310d indicates the vehicle 30d is traveling at 60 mph (e.g., the vehicle 30d may be a better candidate). The analysis by the selection criteria may select the vehicle 30d as the selected vehicle 320c.

In the example traffic scenario 300 with the vehicle 30f selected as the target vehicle 320b and the vehicle 30d as the complementary selected vehicle 320c by the selection criteria, the analysis by the selection criteria may determine that the vehicle 30h and the vehicle 30i are both far from the selected vehicles 320a-320c. Furthermore, the vehicle 30h and the vehicle 30i both make approximately a 90 degree angle with the selected vehicles 320a-320c. However, the velocity information 310h indicates the vehicle 30h is traveling at 5 mph and the velocity information 310i indicates the vehicle 30i is traveling at 35 mph. The selection criteria may determine that the vehicle 30i may be a better candidate since the vehicle 30h may be traveling below a minimum speed threshold (e.g., below 7 mph may be an elimination factor). The analysis by the selection criteria may select the vehicle 30i as the selected vehicle 320d.

The selection criteria implemented by the relative positioning module 152 may select the vehicles 30a, 30f, 30d and 30i as the selected vehicles 320a-320d. Four of the vehicles 30a-30i may be used for the selected vehicles 320a-320d to provide a solution with sufficient accuracy while balancing computation time and/or computation power. The selected vehicles 320a-320d may provide the efficient combination of nearby vehicles to generate the cooperative positioning solution.

Figure 5:
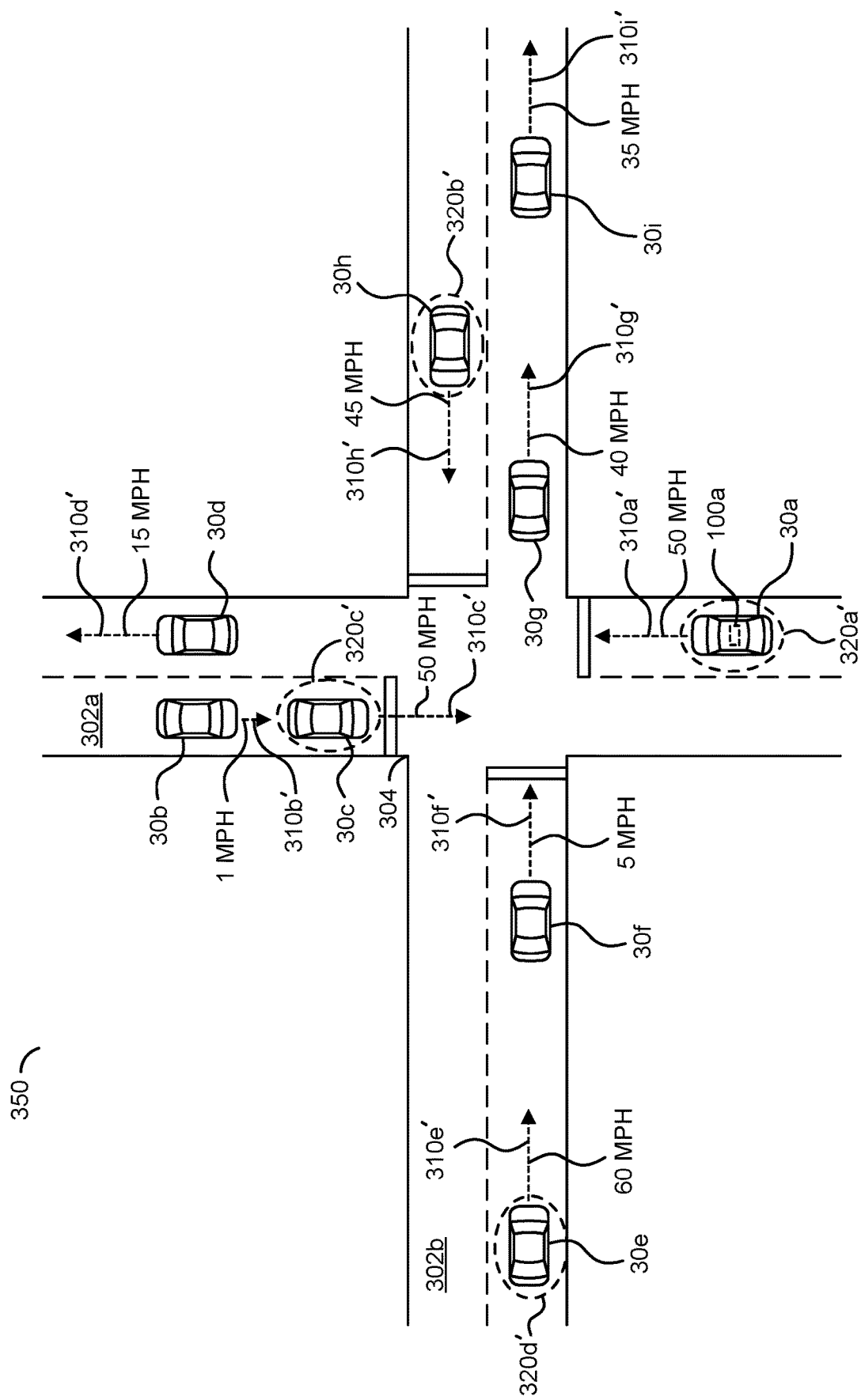
FIG. 5 is a diagram illustrating a selection criteria for an example traffic scenario.

Referring to FIG. 5, a diagram illustrating a selection criteria for an example traffic scenario 350 is shown. The road 302a, the road 302b and the intersection 304 are shown. In the example traffic scenario 350 shown, the vehicles 30a-30i may be driving on the roads 302a-302b. In the example shown, the apparatus 100a may be implemented in (or on) the vehicle 30a. Similarly the other vehicles 30b-30i may implement one of the modules (e.g., 100b-100i). The example traffic scenario 350 may be similar to the example traffic scenario 300 (described in association with FIG. 4) with some alterations.

In the example traffic scenario 350 shown, each of the vehicles 30a-30i may have an associated velocity 310a'-310i' (e.g., speed and/or heading). In the example shown, the vehicle 30a may have the velocity 310a' of 50 mph heading north, the vehicle 30b may have the velocity 310b' of 1 mph heading south, the vehicle 30c may have the velocity 310c' of 50 mph heading south, the vehicle 30d may have the velocity 310d' of 15 mph heading north, the vehicle 30e may have the velocity 310e' of 60 mph heading east, the vehicle 30f may have the velocity 310f' of 5 mph heading east, the vehicle 30g may have the velocity 310g' of 40 mph heading east, the vehicle 30h may have the velocity 310h' of 45 mph heading west, and the vehicle 30i may have the velocity 310i' of 35 mph heading east. The selection criteria implemented by the module 100a may select from the vehicles 30a-30i based on the velocity information 310a'-310i' and/or the arrangement and distance with respect to the host vehicle 30a.

In the example traffic scenario 350, the selected vehicles 320a'-320d' may comprise four vehicles (e.g., the vehicle 30a, the vehicle 30c, the vehicle 30e and the vehicle 30h). The selected vehicle 320a' may be the host vehicle 30a (e.g., the module 100a may be implementing the selection criteria). The selected vehicle 320b' may be the target vehicle 30h. The selected vehicle 320c' may be the vehicle 30c and the selected vehicle 320d' may be the vehicle 30e.

The vehicle 30h may be selected as the target vehicle (e.g., the selected vehicle 320b'). The analysis performed using the selection criteria may determine that the vehicle 30h may be the most likely of the vehicles 30b-30i to cross the predicted path of the host vehicle 30a. In the example shown, the vehicle 30a and the vehicle 30h may cross the intersection 304 at approximately the same time from the road 302a and the road 302b, respectively (e.g., both vehicles are approximately similar distances from the intersection 304 and traveling at similar speeds). The analysis by the selection criteria may determine that the vehicles 30*g* and 30*i* may not cross the predicted paths with the vehicle 30*a* (e.g., traveling away from the intersection 304 on the road 302*b*).

The analysis by the selection criteria may determine that the vehicle 30*e* may not cross the predicted paths with the vehicle 30*a* (e.g., the vehicle 30*e* is farther away from the intersection 304 and traveling behind the vehicle 30*f*). In some embodiments, the analysis by the selection criteria may determine that the vehicle 30*d* may not cross the predicted paths with the vehicle 30*a* (e.g., the vehicle 30*d* is traveling away from the intersection 304 on the road 302*a* and is traveling the same direction as the vehicle 30*a*). In some embodiments, the analysis by the selection criteria may determine that the vehicle 30*d* may cross the predicted paths with the vehicle 30*a* (e.g., the vehicle 30*d* is traveling away from the intersection 304 on the road 302*a* and in the same direction of the vehicle 30*a* but at a slower speed, which could result in the vehicle 30*a* colliding with the vehicle 30*d* from behind). Whether the analysis by the selection criteria determines that the vehicle 30*d* may collide with the vehicle 30*a* may depend on the particular amount of time of the time frame for determining the target vehicle 30*b*. For example, the vehicle 30*d* may be a candidate for the target vehicle.

The analysis by the selection criteria may determine that the vehicle 30*b* and the vehicle 30*c* may not cross predicted paths with the vehicle 30*a* (e.g., both are in the opposite lane). In some embodiments, the analysis by the selection criteria may not be able to determine that the vehicles 30*b* and 30*c* are in the opposite lane (e.g., the low accuracy position results may not provide sufficient evidence that the vehicles are in different lanes). If there is sufficient accuracy from the low accuracy result to determine the vehicles 30*b* and/or 30*c* are in an opposite lane to the host vehicle 30*a*, then the selection criteria may determine that the vehicles 30*b* and 30*c* may not cross predicted paths with the vehicle 30*a* on the basis of traveling in opposite lanes. Since the vehicle 30*c* may collide with the vehicle 30*a* and the velocity 310*c'* is relatively high, the vehicle 30*c* may be a candidate for the target vehicle.

The analysis by the selection criteria may determine that the vehicle 30*f* may be a candidate for the target vehicle. However, the vehicle 30*f* is approaching the intersection 304 at a low speed (e.g., 5 mph, which is below the selection threshold), and may be slowing down to stop before entering the intersection 304 (e.g., the vehicle 30*h* may be a better candidate for the target vehicle than the vehicle 30*f*). The vehicle 30*f* may be eliminated from candidacy based on having a speed below the threshold speed.

By analyzing the velocity information 310*a'*-310*i'* and/or the position of the vehicles 30*a*-30*i*, the selection criteria implemented by the relative positioning module 152 may determine that the target vehicle 320*b'* may be the vehicle 30*h*.

In the example traffic scenario 350 with the vehicle 30*h* selected as the target vehicle 320*b'* by the selection criteria, the relative positioning module 152 may select the two complementary vehicles 320*c'*-320*d'*. The complementary selected vehicles 320*c'*-320*d'* may be selected with respect to the selected vehicles 320*a'*-320*b'*. For example, the selection criteria may prefer the two complementary vehicles 320*c'*-320*d'* to be furthest away and/or at approximately 90 degrees with respect to the two selected vehicles 320*a'*-320*b'* (e.g., the host vehicle 320*a'*, the target vehicle 320*b'*, and the two complementary vehicles 320*c'*-320*d'* may approximate four corners of a rectangular shape and the four corners may have a sufficient distance from each other). The selection criteria may prefer vehicles that are traveling at least at a speed of approximately 7 mph (e.g., 3 meters per second).

In the example traffic scenario 350 with the vehicle 30*h* selected as the target vehicle 320*b'* by the selection criteria, the relative positioning module 152 may select the vehicle 30*c* as the complementary vehicle 320*c'* and the vehicle 30*e* as the selected vehicle 320*d'*. The vehicles 30*c* and 30*e* may be the complementary vehicles 320*c'*-320*d'* based on the distance and/or speed relative to the selected vehicles 320*a'*-320*b'*. The analysis by the selection criteria may determine that the vehicle 30*i* is far from the selected vehicle 320*a'* but close to the selected vehicle 320*b'*. The analysis by the selection criteria may determine that the velocity information 310*f'* (e.g., 5 mph) of vehicle 30*f* is below the speed threshold (e.g., an elimination factor).

The analysis by the selection criteria may determine that the vehicle 30*g* is close to both the selected vehicles 320*a'*-320*b'*. The analysis by the selection criteria may determine that the vehicle 30*b*, the vehicle 30*c*, and the vehicle 30*d* are each far from the selected vehicles 320*a'*-320*b'*. However, the velocity information 310*b'* indicates the vehicle 30*b* is traveling at 1 mph and the velocity information 310*d'* indicates the vehicle 30*d* is traveling at 15 mph (e.g., the vehicle 30*d* may be a better candidate). The analysis by the selection criteria may select the vehicle 30*c* as the selected vehicle 320*c'* because the velocity information 310*c'* indicates the vehicle 30*c* is traveling at 50 mph and the velocity information 310*d'* indicates the vehicle 30*d* is traveling at 15 mph (e.g., the vehicle 30*c* may be a better candidate, even though the vehicle 30*d* is farther away from the selected vehicles 320*a'*-320*b'*).

In the example traffic scenario 350 with the vehicle 30*h* selected as the target vehicle 320*b'* and the vehicle 30*c* as the complementary vehicle 320*c'* by the selection criteria, the analysis by the selection criteria may determine that the vehicle 30*e* and the vehicle 30*f* are both far from the selected vehicles 320*a'*-320*c'*. Furthermore, the vehicle 30*e* and the vehicle 30*f* both make approximately a 90 degree angle with the selected vehicles 320*a'*-320*c'*. However, the velocity information 310*f'* indicates the vehicle 30*f* is traveling at 5 mph and the velocity information 310*e'* indicates the vehicle 30*e* is traveling at 60 mph. The selection criteria may determine that the vehicle 30*e* may be a better candidate since the vehicle 30*f* may be traveling below a minimum speed threshold (e.g., below 7 mph) and the vehicle 30*e* is farther away from the selected vehicles 320*a'*-320*c'* than the vehicle 30*f*. The analysis by the selection criteria may select the vehicle 30*e* as the complementary vehicle 320*d'*.

The example traffic scenario 350 and the example traffic scenario 300 (shown in association with FIG. 4) describe a 4-way intersection on level terrain. The selection criteria implemented by the relative positioning module 152 may be configured to select from the vehicles 30*a*-30*i* for the efficient cooperative positioning solution regardless of the road types and/or a shape of the terrain. In an example, a layout of the roads that the vehicles 30*a*-30*i* drive on may not hinder determining the efficient vehicles for calculations since the selection criteria may analyze relative speed and/or relative distance. The layout of the roads may be relevant to the selection criteria to determine which of the vehicles 30*a*-30*i* may be the target vehicle (e.g., the path of the roads may indicate which vehicles may be on paths that may meet). The selection criteria may take the path and/or direction of the roads when selecting the target vehicle.

Similar to the path of the roads, an altitude may also be used to determine a likelihood of a collision. Altitude may be used by the selection criteria as an elimination factor for determining the target vehicle when altitude is indicative of vehicles not colliding (e.g., in an overpass scenario). Generally, the ranging implemented by the module 100a and/or the relative positioning module 152 may determine an absolute distance between the host vehicle 30a and/or the other vehicles 30b-30i. For example, an absolute distance may take altitude into account. In another example, the selection criteria may implement a restriction on selecting a particular vehicle if the height distance is above a predetermined threshold. The selection criteria may be configured to analyze as many factors as are available (e.g., vehicle speed, vehicle distance, vehicle altitude, road layout, road conditions, traffic conditions, construction detours, weather conditions, etc.) to determine the target vehicle and/or the complementary vehicles used for determining the cooperative positioning solution.

Figure 6:
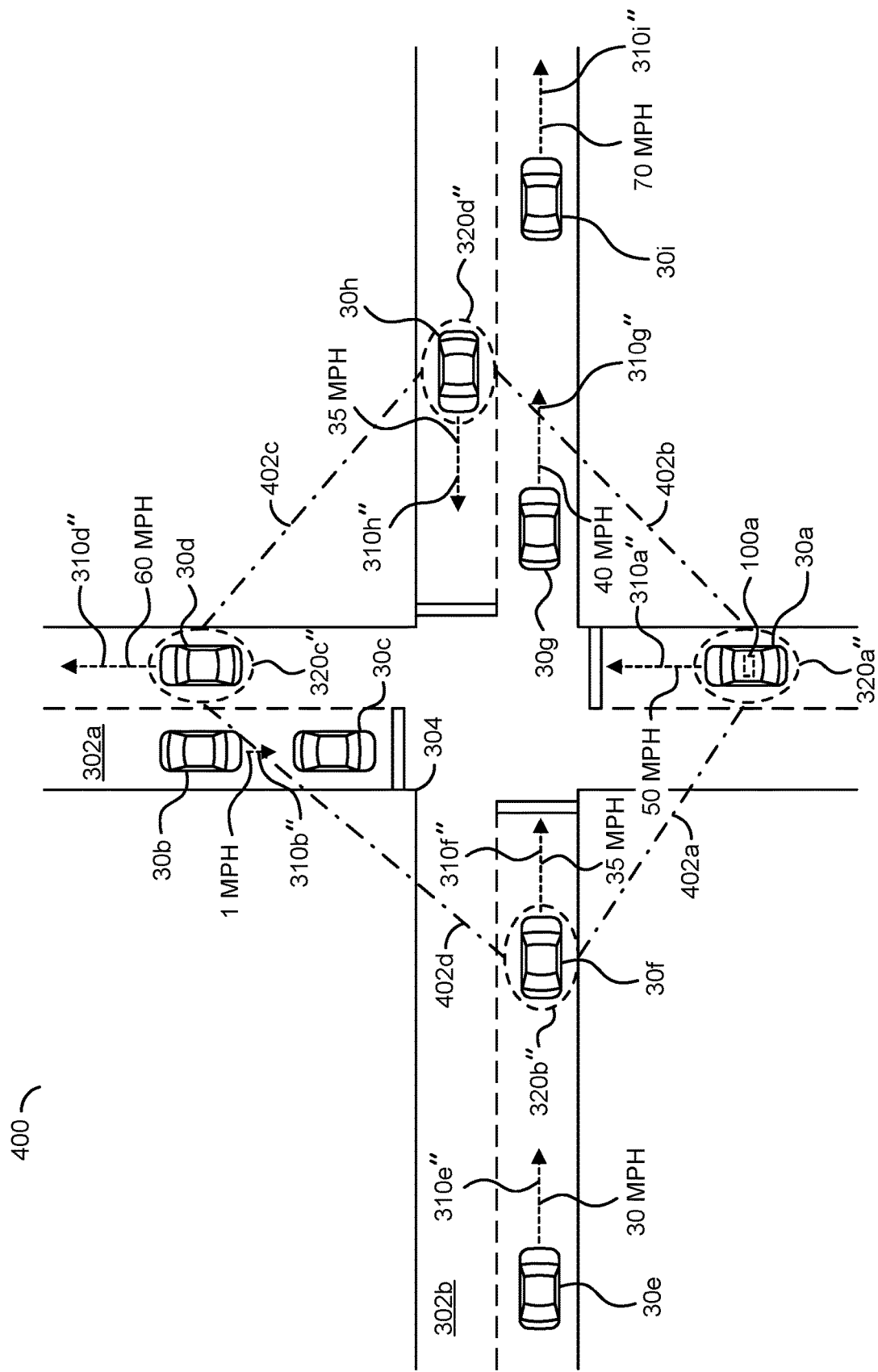
FIG. 6 is a diagram illustrating a selection criteria for an example traffic scenario.

Referring to FIG. 6, a diagram illustrating a selection criteria for an example traffic scenario 400 is shown. The road 302a, the road 302b and the intersection 304 are shown. In the example traffic scenario 400 shown, the vehicles 30a-30i may be driving on the roads 302a-302b. In the example shown, the apparatus 100a may be implemented in (or on) the vehicle 30a. Similarly the other vehicles 30b-30i may implement one of the modules (e.g., 100b-100i). The example traffic scenario 400 may have an arrangement similar to the example traffic scenario 300 (described in association with FIG. 4) with some alterations.

In the example shown, the vehicle 30a may have the velocity 310a" of 50 mph heading north, the vehicle 30b may have the velocity 310b" of 1 mph heading south, the vehicle 30c may have the velocity 310c" of 0 mph heading south (not shown), the vehicle 30d may have the velocity 310d" of 60 mph heading north, the vehicle 30e may have the velocity 310e" of 30 mph heading east, the vehicle 30f may have the velocity 310f" of 35 mph heading east, the vehicle 30g may have the velocity 310g" of 40 mph heading east, the vehicle 30h may have the velocity 310h" of 35 mph heading west, and the vehicle 30i may have the velocity 310i" of 70 mph heading east.

The selection criteria implemented by the module 100a may select from the vehicles 30a-30i based on the velocity information 310a"-310i" and/or the arrangement and distance with respect to the host vehicle 30a.

In the example traffic scenario 400, the velocity information 310a"-310i" may be similar to the velocity information 310a-310i shown in the example traffic scenario 300 (described in association with FIG. 4). For example, the vehicles 30a, 30b, 30c, 30d, 30e and 30g have the same velocity (e.g., the velocity information 310a", 310b", 310c", 310d", 310e" and 310g" are the same as the corresponding velocity information 310a, 310b, 310c, 310d, 310e and 310g). The velocity information 310f" has changed to 35 mph (from the velocity information 310f of 50 mph) the velocity information 310h" has changed to 35 mph (from the velocity information 310h of 5 mph) and the velocity information 310i" has changed to 70 mph (from the velocity information 310i of 35 mph).

In the example traffic scenario 400, the selected vehicles 320a"-320d" may comprise four vehicles (e.g., the vehicle 30a, the vehicle 30d, the vehicle 30f and the vehicle 30h). The selected vehicle 320a" may be the host vehicle 30a (e.g., the module 100a may be implementing the selection criteria). The selected vehicle 320b" may be the target vehicle 30f. The selected vehicle 320c" may be the vehicle 30d and the selected vehicle 320d" may be the vehicle 30h. For example, the complementary vehicle 320d" has changed to the vehicle 30h (from the complementary vehicle 320d of 30i in the traffic scenario 300) despite the vehicle 30i being farther away and traveling faster than the vehicle 30h.

The vehicle 30f may be selected as the target vehicle (e.g., the selected vehicle 320b"). The selection criteria analysis performed by the relative positioning module 152 may determine that the vehicle 30f may be the most likely of the vehicles 30b-30i to cross the predicted path of the host vehicle 30a. In the example shown, the vehicle 30a and the vehicle 30f may cross the intersection 304 at approximately the same time from the road 302a and the road 302b, respectively (e.g., both vehicles are approximately the same distance from the intersection 304 and converging towards the same position).

The selection criteria analysis performed by the relative positioning module 152 may determine that the vehicle 30h may also be a candidate for the target vehicle. The vehicle 30h may be approaching the intersection 304 at the same speed (e.g., 35 mph) as the vehicle 30f, but is slightly farther away from the vehicle 30a than the distance between the vehicle 30f and the vehicle 30a. The vehicle 30f may be a good candidate for the target vehicle 320b" and the vehicle 30h may also be a good candidate for the target vehicle 320b". In an example, the selection criteria may identify the vehicle 30f as a better candidate than the vehicle 30h. The selection criteria may determine that the vehicle 30f is a most likely target and select the vehicle 30f as the selected vehicle 320b".

In the example traffic scenario 400 with the vehicle 30f selected as the target vehicle 320b" by the selection criteria, the relative positioning module 152 may select the complementary vehicles 320c"-320d". Similar to the analysis performed by the relative positioning module 152 for the traffic scenario 300 (described in association with FIG. 4), the vehicle 30d may be selected as one of the complementary vehicles (e.g., 320c"). However, in the example traffic scenario 400, the vehicle 30h may be selected as one of the complementary vehicles 320d" (as opposed to the vehicle 30i in the traffic scenario 300).

In the example traffic scenario 400 with the vehicle 30f selected as the target vehicle 320b" and the vehicle 30d as the complementary selected vehicle 320c" by the selection criteria, the selection criteria analysis by the relative positioning module 152 may determine that the vehicle 30h and the vehicle 30i are both sufficiently far from the selected vehicles 320a"-320c".

Furthermore, the vehicle 30h and the vehicle 30i both make approximately a 90 degree angle with the selected vehicles 320a"-320c". The velocity information 310h" indicates the vehicle 30h is traveling at 35 mph and the velocity information 310i" indicates the vehicle 30i is traveling at 70 mph.

Despite the vehicle 30i traveling at a higher speed than the vehicle 30h, the selection criteria may determine that the vehicle 30h may be a better candidate for the complementary selected vehicle 320d". The vehicle 30i may be a good candidate because the speed and/or distance parameters of the vehicle 30i may be better (e.g., farther away and faster) compared to the speed and/or distance of the vehicle 30h. However, the selection criteria may prefer the vehicle 30h because the vehicle 30h may have been determined as a potential candidate for the target vehicle. For example, the vehicle 30h may not be the best candidate based on speed and/or distance, but the vehicle 30h may fit the selection criteria because the vehicle 30h may be a candidate for the target vehicle. The relative positioning module 152 may select the vehicle 30h as the complementary vehicle 320d".

Lines 402a-402d are shown. The lines 402a-402d may represent an arrangement (e.g., orientation) of the selected vehicles 320a"-320d". The line 402a may be between the selected vehicle 320a" (e.g., the vehicle 30a) and the selected vehicle 320b" (e.g., the vehicle 30f). The line 402b may be between the selected vehicle 320a" (e.g., the vehicle 30a) and the selected vehicle 320d" (e.g., the vehicle 30h). The line 402c may be between the selected vehicle 320d" (e.g., the vehicle 30h) and the selected vehicle 320c" (e.g., the vehicle 30d). The line 402d may be between the selected vehicle 320c" (e.g., the vehicle 30d) and the selected vehicle 320b" (e.g., the vehicle 30f).

The lines 402a-402d form a generally rectangular shape. The selected vehicles 320a"-320d" may be located at approximately the four corners of the rectangular shape. In one example, the host vehicle 320a" and the target vehicle 320b" may form approximately a 90 degree angle with the complementary vehicle 320c" (e.g., the lines 402a and 402d). In another example, the host vehicle 320a" and the target vehicle 320b" may form approximately a 90 degree angle with the complementary vehicle 320d" (e.g., the lines 402a and 402b). In yet another example, the arrangement of the selected vehicles 320a"-320d" may be a rectangular shape with each of the selected vehicles 320a"-320d" at different corners. In some embodiments, the host vehicle 320a", the target vehicle 320b", and the two complementary vehicles 320c"-320d" may approximate four corners of a rectangular shape (e.g., the lines 402a-402d) and the four corners (e.g., the selected vehicles 320a"-320d") may have a sufficient distance from each other.

In one example, the sufficient distance may be a relative distance between 5 m and 100 m. For example, in an urban environment, the vehicles 30a-30i may be tracked from 45m-75m (e.g., depending on the speed of the host vehicle 320a" and/or the time that the vehicles may cross paths). In some embodiments, a maximum radio range may be 100m in a non-line of sight scenario. The amount for the sufficient distance may be varied according to the design criteria of a particular implementation and/or communication protocols and/or technology implemented.

The arrangement of the vehicles 30a-30i may be used as part of the selection criteria for determining the selected vehicles 320a"-320d". Vehicles that form the rectangular arrangements 402a-402d may be better (e.g., preferred) candidates for the selected vehicles 320a"-320d" (e.g., a rectangular arrangement may result in a more efficient calculation of the cooperative positioning solution).

Figure 7:
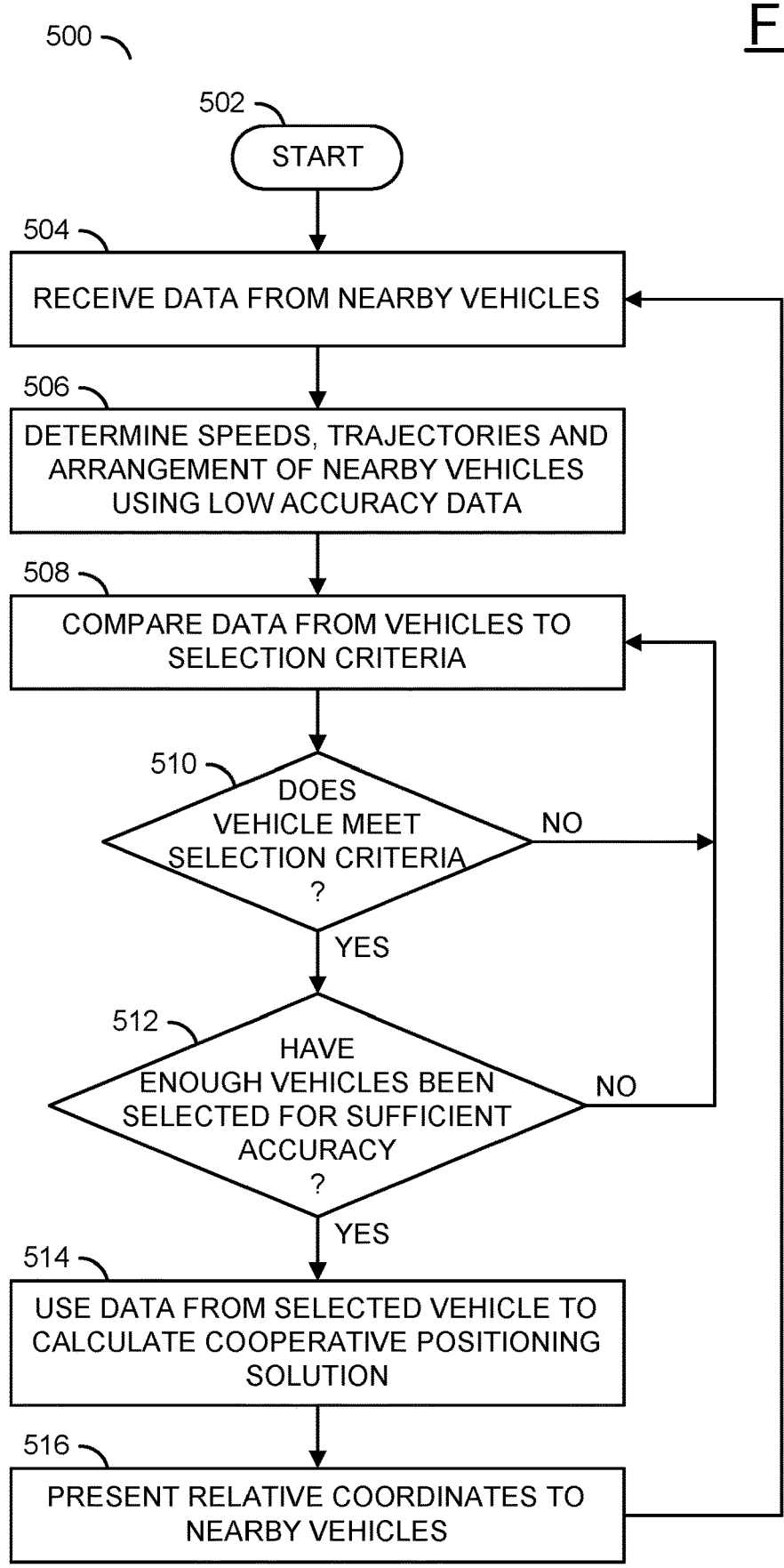
FIG. 7 is a flow diagram illustrating a method for determining an efficient cooperative positioning solution.

Referring to FIG. 7, a method (or process) 500 is shown. The method 500 may determine an efficient cooperative positioning solution. The method 500 generally comprises a step (or state) 502, a step (or state) 504, a step (or state) 506, a step (or state) 508, a decision step (or state) 510, a decision step (or state) 512, a step (or state) 514, and a step (or state) 516.

The state 502 may start the method 500. Next, in the state 504, the transceiver 122 may receive data (e.g., the signals RAA-RNN) from the nearby vehicles 30a-30n. In the state 506, the processor 124 (e.g., the relative positioning module 152) may determine the speeds, trajectories and/or arrangement of the nearby vehicles 30a-30n using the low accuracy data (e.g., the position coordinates 170a). For example, the low accuracy data may be one component of the signals RAA-RNN. In one example, from the low accuracy data, the relative positioning module 152 may determine the velocity information 310a-310i (e.g., shown in association with FIG. 4). Next, in the state 508, the processor 124 may compare the data (e.g., the velocity information 310a-310i and/or other information in the low accuracy data) from each of the vehicles 30a-30n to the selection criteria. Next, the method 500 may move to the decision state 510.

In the decision state 510, the processor 124 may determine whether one of the vehicles 30a-30n meets the selection criteria. In one example, the processor 124 may determine which of the vehicles 30a-30n may be the target vehicle 320b. In another example, the processor 124 may determine which of the vehicles 30a-30n may be the complementary selected vehicles 320c-320d. If the vehicle does not meet selection criteria, the method 500 may return to the state 508. If the vehicle does meet the selection criteria, the method 500 may move to the decision state 512.

In the decision state 512, the processor 124 may determine whether enough of the vehicles 30a-30n have been selected to provide sufficient accuracy. In one example, selecting four of the vehicles 30a-30n may provide sufficient accuracy. If enough of the vehicles have not been selected, the method 500 may return to the state 508. If enough of the vehicles have been selected, the method 500 may move to the state 514. While the vehicle selection steps 508, 510 and/or 512 are shown as separate steps, the vehicle selection may be performed in parallel (e.g., the selected vehicles 320a-320d may be selected at or near the same time rather than selected one at a time).

In the state 514, the processor 124 may use the data (e.g., from the signals RAA-RNN) from the selected vehicles 320a-320d to calculate the cooperative positioning solution. Next, in the state 516, the apparatus 100 may present the relative coordinates 170d to each of the nearby vehicles 30a-30n. Next, the method 500 may return to the state 504.

Figure 8:
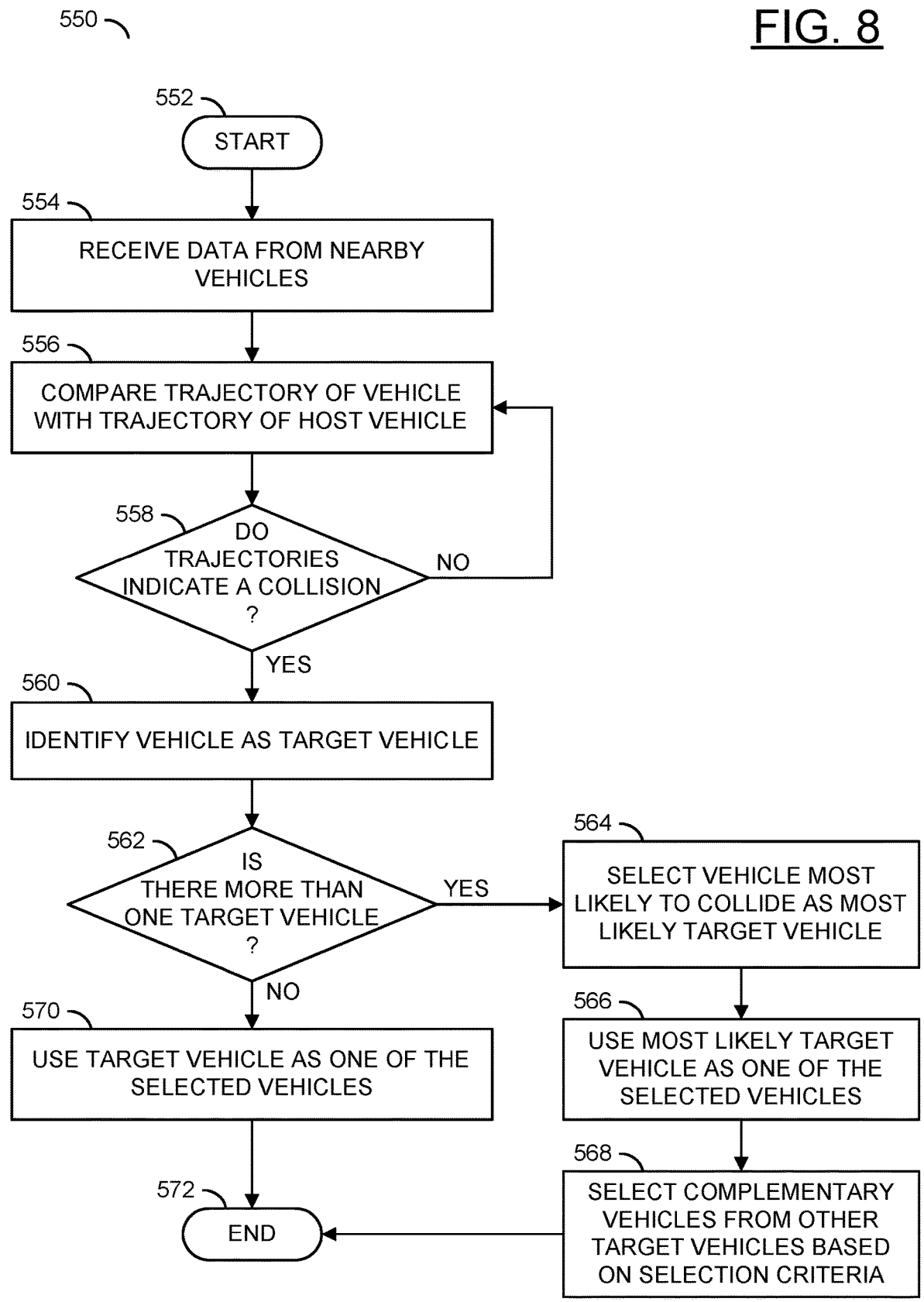
FIG. 8 is a flow diagram illustrating a method for selecting a target vehicle.

Referring to FIG. 8, a method (or process) 550 is shown. The method 550 may select the target vehicle 320b. The method 550 generally comprises a step (or state) 552, a step (or state) 554, a step (or state) 556, a decision step (or state) 558, a step (or state) 560, a decision step (or state) 562, a step (or state) 564, a step (or state) 566, a step (or state) 568, a step (or state) 570, and a step (or state) 572.

The state 552 may start the method 550. In the state 554, the transceiver 122 may receive data (e.g., the signals RAA-RNN) from the nearby vehicles 30a-30n. In the state 556, the processor 124 (e.g., the relative positioning module 152) may compare a trajectory of one of the vehicles 30b-30n with the trajectory of the host vehicle 30a. Next, the method 550 may move to the decision state 558. In the decision state 558, the processor 124 may determine whether the trajectories indicate a collision. If not, the method 550 may return to the state 556. If the trajectories indicate a collision, the method 550 may move to the state 560. In the state 560, the processor 124 may identify the vehicle that has a predicted trajectory indicating a potential collision as a potential candidate for the target vehicle 320b. Next, the method 550 may move to the decision state 562. While the steps 556, 558 and/or 560 for identifying a potential target vehicle are shown as separate steps, the vehicles may be analyzed and/or selected in parallel (e.g., the vehicles 30a-30n identified as being on a possible collision course may be identified at or near the same time rather than analyzed one at a time).

In the decision state 562, the processor 124 may determine whether there are more than one potential target vehicles. If there are not more than one target vehicles, the method 550 may move to the state 570. In the state 570, the processor 124 may use the potential target vehicle as one of the selected vehicles 320a-320d (e.g., as the target vehicle 320b). Next, the method 550 may move to the state 572. In the decision state 562, if there are more than one potential target vehicles, the method 550 may move to the state 564. In the state 564, the processor 124 may select the vehicle most likely to collide with the host vehicle 320a as the most likely target vehicle. Next, in the state 566, the processor 124 may use the most likely target vehicle as one of the selected vehicles 320a-320d (e.g., the target vehicle 320b). In the state 568, the processor 124 may select the complementary vehicles 320c-320d from the other potential target vehicles based on the selection criteria. For example, the other potential target vehicles may have a higher probability of being one of the selected vehicles 320a-320d than vehicles that are not potentially on a collision course with the host vehicle 30a. Next, the method 550 may move to the state 572. The state 572 may end the method 550.

Figure 9:
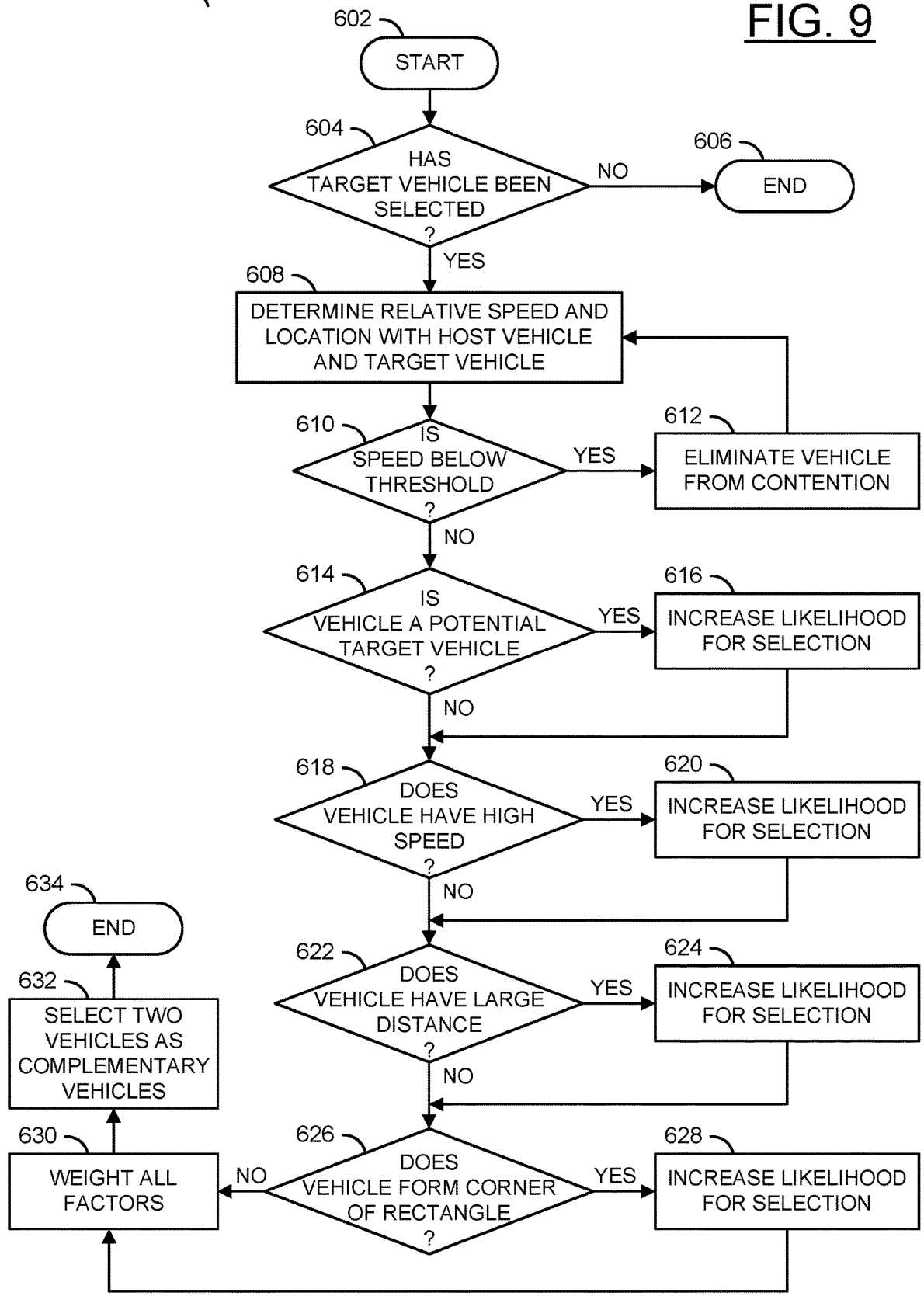
FIG. 9 is a flow diagram illustrating a method for selecting complementary vehicles according to a selection criteria.

Referring to FIG. 9, a method (or process) 600 is shown. The method 600 may select the complementary vehicles 320c-320d according to a selection criteria. The method 600 generally comprises a step (or state) 602, a decision step (or state) 604, a step (or state) 606, a step (or state) 608, a decision step (or state) 610, a step (or state) 612, a decision step (or state) 614, a step (or state) 616, a decision step (or state) 618, a step (or state) 620, a decision step (or state) 622, a step (or state) 624, a decision step (or state) 626, a step (or state) 628, a step (or state) 630, a step (or state) 632, and a step (or state) 634.

The state 602 may start the method 600. Next, in the decision state 604, the processor 124 may determine whether the target vehicle 320b has been selected. If target vehicle 320b has not been selected, the method 600 may move to the state 606. The state 606 may end the method 600. For example, the complementary vehicles 320c-320d may not be selected until after the target vehicle 320b has been selected. In the decision state 604, if the target vehicle 320b has been selected, the method 600 may move to the state 608.

In the state 608, the processor 124 may determine the relative speed and/or location of the vehicles 30a-30n with respect to the host vehicle 320a and the target vehicle 320b. Next, the method 600 may proceed through a series of checks and/or threshold tests to determine which of the vehicles 30a-30n may be the best candidates for the complementary vehicles 320c-320d. The decision states 610, 614, 618, 622 and/or 626 may represent some of the checks and/or threshold tests for selecting the complementary vehicles 320c-320d. The decision states 610, 614, 618, 622 and/or 626 may be performed in any order and/or in parallel. Other checks and/or threshold tests may be performed. Each of the checks and/or threshold tests may have a weighted value applied to determine which of the vehicles 30a-30n fit the selection criteria. The number, order and/or importance of each of the checks and/or threshold tests may be varied according to the design criteria of a particular implementation.

In the example shown, the method 600 may next move to the decision state 610. In the decision state 610, the processor 124 may determine whether the speed of one or more of the vehicles 30a-30n are below a threshold speed (e.g., 3 meters per second). If the speed is below the threshold speed, the method 600 may move to the state 612. In the state 612, the vehicles 30a-30n that are below the threshold speed may be eliminated from contention (e.g., for the complementary vehicles 320c-320d) by the processor 124. Next, the method 600 may return to the state 608. In the decision state 610, if the speed is above the threshold speed, the method 600 may move to the decision state 614.

In the decision state 614, the processor 124 may determine whether one or more of the vehicles 30a-30n was determined to be a potential target vehicle (e.g., as shown in association with FIG. 8). If one of the vehicles 30a-30n was determined to be a potential target vehicle, the method 600 may move to the state 616. In the state 616, the processor 124 may increase the likelihood of selection for the vehicle that was determined to be a potential target vehicle (or decrease the likelihood of selection for other vehicles that are not potential target vehicles). Next, the method 600 may move to the decision state 618. In the decision state 612, if the vehicle is not a potential target vehicle, the method 600 may move to the decision state 618.

In the decision state 618, the processor 124 may determine whether one or more of the vehicles 30a-30n has high speed (e.g., based on the velocity information 310a-310n). For example, the velocity information 310a-310n of the vehicles 30a-30n may be compared and the highest speeds (e.g., relative to the selected vehicles 320a-320b) may be preferred. If one of the vehicles 30a-30n has a high speed (or the highest speed), the method 600 may move to the state 620. In the state 620, the processor 124 may increase the likelihood of selection for the vehicle that was determined to have the high speed (or decrease the likelihood of selection for other vehicles that may not have a high speed). Next, the method 600 may move to the decision state 622. In the decision state 618, if the vehicle does not have the high speed, the method 600 may move to the decision state 622.

In the decision state 622, the processor 124 may determine whether one or more of the vehicles 30a-30n has a large distance from the host vehicle 320a and/or the target vehicle 320b (e.g., based on the velocity and location information 310a-310n and/or the low accuracy position information 170a). For example, the low accuracy position information 170a of the vehicles 30a-30n may be compared and the largest relative distances from the selected vehicles 320a-320b may be preferred. If one of the vehicles 30a-30n has a large distance (or the largest relative distance), the method 600 may move to the state 624. In the state 624, the processor 124 may increase the likelihood of selection for the vehicle that was determined to have the large distance (or decrease the likelihood of selection for other vehicles that may not have a large distance). Next, the method 600 may move to the decision state 626. In the decision state 622, if the vehicle does not have the large distance, the method 600 may move to the decision state 626.

In the decision state 626, the processor 124 may determine whether one or more of the vehicles 30a-30n forms a corner of a rectangular shape with respect to the host vehicle 320a and/or the target vehicle 320b (e.g., as shown by the lines 402a-402d in association with FIG. 6). For example, the low accuracy position information 170a of the vehicles 30a-30n may be checked relative to the selected vehicles 320a-320b to determine whether a rectangular shape may be formed. If one of the vehicles 30a-30n forms a corner of a rectangle, the method 600 may move to the state 628. In the state 628, the processor 124 may increase the likelihood of selection for the vehicle that was determined to form the corner of the rectangular shape (or decrease the likelihood of selection for other vehicles that may not form the rectangular shape). Next, the method 600 may move to the decision state 630. In the decision state 626, if the vehicle does not form the corner of a rectangle, the method 600 may move to the decision state 630.

In the state 630, the processor 124 may apply a weight to each of the factors (e.g., compare the weight values applied corresponding to the checks and/or threshold tests). For example, the weights may be checked for each of the vehicles 30a-30n to determine a most suitable combination for the selection criteria. Next, in the state 632, the processor 124 may select two of the vehicles 30a-30n as the complementary vehicles 320c-320d (e.g., based on the weights applied). Next, the method 600 may move to the state 634. The state 634 may end the method 600.

The functions performed by the diagrams of FIGS. 7-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a transceiver module configured to send/receive data messages to/from a plurality of vehicles; and
a processor configured to (i) determine a plurality of selected vehicles from said plurality of vehicles and (ii) calculate relative coordinates of said plurality of vehicles based on said data messages from said selected vehicles, wherein (a) said plurality of selected vehicles comprise (i) a target vehicle selected using a first selection criteria and (ii) at least two complementary vehicles selected using a second selection criteria, (b) said first selection criteria comprises detecting a predicted trajectory of one of said plurality of vehicles that crosses paths with a predicted trajectory of said apparatus and (c) factors for selecting said complementary vehicles from said plurality of vehicles using said second selection criteria comprise (i) an arrangement of said plurality of vehicles and (ii) speeds of said plurality of vehicles.

2. The apparatus according to claim 1, wherein (i) said processor comprises a relative positioning module and (ii) said relative positioning module is configured to perform said first selection criteria and said second selection criteria.

3. The apparatus according to claim 1, wherein (i) said first selection criteria and said second selection criteria are implemented to select four of said plurality of vehicles as said selected vehicles, (ii) said selected vehicles comprise a host vehicle, said target vehicle and two of said complementary vehicles and (iii) said apparatus is implemented by said host vehicle.

4. The apparatus according to claim 1, wherein said first selection criteria and said second selection criteria enable a selection of said plurality of selected vehicles to determine a cooperative positioning solution for calculating said relative coordinates.

5. The apparatus according to claim 4, wherein said first selection criteria and said second selection criteria are configured to select said plurality of selected vehicles based on a balance between an accuracy of said relative coordinates calculated and an efficiency of determining said relative coordinates.

6. The apparatus according to claim 5, wherein (a) said efficiency of determining said relative coordinates (i) comprises a computation time and an amount of computation power to determine said relative coordinates and (ii) decreases as a number of said selected vehicles increases and (b) said accuracy of said relative coordinates calculated decreases as said number of said selected vehicles decreases.

7. The apparatus according to claim 1, wherein said second selection criteria comprises (i) detecting a second target vehicle based on said first selection criteria and (ii) a predicted trajectory of said second target vehicle is less likely to cross crosses with said predicted trajectory of said apparatus than said target vehicle.

8. The apparatus according to claim 1, wherein said speeds of said plurality of vehicles used for second selection criteria further comprises selecting said complementary vehicles that have a higher speed than unselected vehicles in said plurality of vehicles.

9. The apparatus according to claim 1, wherein said selected vehicles have a speed above a pre-determined threshold speed of approximately 3 meters per second.

10. The apparatus according to claim 1, wherein said arrangement of said plurality of vehicles for said second selection criteria comprises selecting said complementary vehicles that have a greater distance from said apparatus than a distance from said apparatus of unselected vehicles in said plurality of vehicles.

11. The apparatus according to claim 1, wherein said second selection criteria selects said complementary vehicles based on said arrangement of said apparatus, said target vehicle and at least one of said complementary vehicles forming an angle of approximately 90 degrees.

12. The apparatus according to claim 1, wherein (i) said speeds of said plurality of vehicles, said arrangement of said plurality of vehicles and said trajectory of said target vehicle are determined based on a GPS heading, a GPS speed and a GPS position and (ii) said relative coordinates provides more accurate location coordinates than said GPS position.

13. The apparatus according to claim 1, wherein said predicted trajectory of said target vehicle potentially crosses paths with said apparatus within 10 seconds.

14. The apparatus according to claim 1, wherein said apparatus is further configured to communicate said relative coordinates determined by said processor to said plurality of said vehicles.

15. The apparatus according to claim 1, wherein said second selection criteria selects said complementary vehicles based on (i) said arrangement of said apparatus, said target vehicle and two of said complementary vehicles approximates four corners of a rectangle and (ii) said four corners of said rectangle have a sufficient distance from each other.

16. The apparatus according to claim 1, wherein said data messages comprise absolute distance measurements between said apparatus and one of said plurality of vehicles communicated alongside a Basic Safety Message (BSM).

17. The apparatus according to claim 1, wherein said first selection criteria and said second selection criteria are configured to determine said plurality of selected vehicles that provide a low amount of uncertainty of said relative coordinates calculated compared to other combinations of said plurality of said vehicles.

18. The apparatus according to claim 1, wherein said first selection criteria and said second selection criteria are configured to determine a combination of said plurality of said vehicles to generate said relative coordinates by weighting said factors.

19. The apparatus according to claim 1, wherein said first selection criteria is different from said second selection criteria.

20. The apparatus according to claim 1, wherein (i) said first selection criteria (a) determines a first candidate vehicle and a second candidate vehicle from said plurality of vehicles and (b) selects said first candidate vehicle as said target vehicle by comparing said first candidate vehicle to said second candidate vehicle using said first selection criteria and (ii) said second selection criteria (a) selects said second candidate vehicle as one of said complementary vehicles, (b) selects an additional candidate vehicle as a second one of said complementary vehicles, if said first selection criteria detects said additional candidate vehicle and (c) weights said factors to select said second one of said complementary vehicles, if said first selection criteria does not detect said additional candidate vehicle.

* * * * *